(12) United States Patent
Gier et al.

(10) Patent No.: US 11,740,633 B2
(45) Date of Patent: Aug. 29, 2023

(54) DETERMINING OCCUPANCY OF OCCLUDED REGIONS

(71) Applicant: Zoox, Inc., Foster City, CA (US)

(72) Inventors: Max Gier, Aachen (DE); William Anthony Silva, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 69 days.

(21) Appl. No.: 17/328,663

(22) Filed: May 24, 2021

(65) Prior Publication Data
US 2021/0278853 A1 Sep. 9, 2021

Related U.S. Application Data

(63) Continuation of application No. 16/289,397, filed on Feb. 28, 2019, now Pat. No. 11,016,492.

(51) Int. Cl.
*G05D 1/02* (2020.01)
*G05D 1/00* (2006.01)
(Continued)

(52) U.S. Cl.
CPC ......... *G05D 1/0214* (2013.01); *G05D 1/0088* (2013.01); *G05D 1/0246* (2013.01);
(Continued)

(58) Field of Classification Search
CPC .. G05D 1/0214; G05D 1/0088; G05D 1/0246; G05D 1/0257; G06V 20/58; G06V 20/584; G06V 20/56
See application file for complete search history.

(56) References Cited

U.S. PATENT DOCUMENTS 6,055,042 A * 4/2000 Sarangapani ......... G01S 13/931
901/46
6,173,215 B1 * 1/2001 Sarangapani ...... B60K 31/0008
700/250
(Continued)

FOREIGN PATENT DOCUMENTS

WO  WO2022009707  1/2022

OTHER PUBLICATIONS

International Preliminary Report on Patentability, dated Sep. 10, 2021, for PCT App No. PCT/US20/18676, 10 pages.
(Continued)

*Primary Examiner* — Mussa A Shaawat
(74) *Attorney, Agent, or Firm* — Lee & Hayes, P.C.

(57) ABSTRACT

Techniques are discussed for controlling a vehicle, such as an autonomous vehicle, based on occluded areas in an environment. An occluded area can represent areas where sensors of the vehicle are unable to sense portions of the environment due to obstruction by another object or sensor limitation. An occluded region for an object is determined, along with one or more visible regions proximate the occluded region. Entry and/or exit regions may be determined based on known directions of traffic and/or drivable surface boundaries. Based on a threshold speed, the vehicle can designate portions of the occluded region as pseudo-visible. Additionally, if a dynamic object traverses through the occluded region from the entry region, a portion of the occluded region may be considered pseudo-visible. Pseudo-visibility may also be determined based on movement of an occluded area. The vehicle can be controlled to traverse the environment based on the pseudo-visibility.

20 Claims, 9 Drawing Sheets

(51) Int. Cl.
　　　*G06K 9/00*　　　　(2022.01)
　　　*G06V 20/58*　　(2022.01)
(52) U.S. Cl.
　　　CPC ........... *G05D 1/0257* (2013.01); *G06V 20/58* (2022.01); *G06V 20/584* (2022.01)

(56) References Cited

U.S. PATENT DOCUMENTS

| | | | | |
|---|---|---|---|---|
| 8,260,485 | B1* | 9/2012 | Meuth | G06Q 10/04 |
| | | | | 701/26 |
| 9,760,090 | B2* | 9/2017 | Shashua | G08G 1/09623 |
| 10,037,613 | B1* | 7/2018 | Becker | G06T 7/277 |
| 10,255,648 | B2* | 4/2019 | Wengreen | G05D 1/0022 |
| 10,268,191 | B1* | 4/2019 | Lockwood | G05D 1/0038 |
| 10,642,275 | B2* | 5/2020 | Silva | B60W 30/18159 |
| 10,783,781 | B2* | 9/2020 | Ootsuji | B62D 1/02 |
| 10,981,497 | B2* | 4/2021 | Lee | B60Q 1/5037 |
| 11,048,265 | B2* | 6/2021 | Silva | G01S 17/89 |
| 11,283,877 | B2* | 3/2022 | Kentley-Klay | G06F 3/0482 |
| 2008/0033645 | A1* | 2/2008 | Levinson | G01S 19/49 |
| | | | | 701/469 |
| 2014/0185880 | A1 | 7/2014 | Fairfield et al. | |
| 2015/0057907 | A1* | 2/2015 | Rebhan | B60W 30/143 |
| | | | | 701/1 |
| 2016/0358475 | A1* | 12/2016 | Prokhorov | G05D 1/0088 |
| 2017/0369051 | A1* | 12/2017 | Sakai | B60W 30/09 |
| 2017/0371338 | A1* | 12/2017 | Kamata | G05D 1/0274 |
| 2018/0033310 | A1 | 2/2018 | Kentley-Klay et al. | |
| 2018/0188743 | A1 | 7/2018 | Wheeler | |
| 2019/0019416 | A1 | 1/2019 | Perko | |
| 2019/0065864 | A1* | 2/2019 | Yu | G06V 10/764 |
| 2019/0138823 | A1* | 5/2019 | Doria | G06V 20/20 |
| 2019/0196481 | A1 | 6/2019 | Tay et al. | |
| 2019/0212746 | A1* | 7/2019 | Cheng | B60W 60/001 |
| 2019/0236955 | A1 | 8/2019 | Hu | |
| 2019/0272433 | A1* | 9/2019 | Yu | G06V 10/44 |
| 2019/0384309 | A1* | 12/2019 | Silva | G01S 17/931 |
| 2019/0384994 | A1 | 12/2019 | Frossard et al. | |
| 2019/0385025 | A1* | 12/2019 | McMichael | G06V 10/82 |
| 2019/0387060 | A1* | 12/2019 | Kentley-Klay | G06F 3/04842 |
| 2020/0050195 | A1 | 2/2020 | Gross et al. | |
| 2020/0128372 | A1 | 4/2020 | Zhang et al. | |
| 2020/0156633 | A1 | 5/2020 | Stephan | |
| 2020/0225669 | A1* | 7/2020 | Silva | B60W 60/0011 |
| 2020/0278681 | A1 | 9/2020 | Gier et al. | |

OTHER PUBLICATIONS

Bouraine et al., "Passively Safe Partial Motion Planning for Mobile Robots", 2014 IEEE International Conference on Robotics and Automationc (ICRA), May 31-Jun. 7, 2017, pp. 3576-pp. 3582.
Bouton et al., "Belief State Planning for Autonomously Navigating Urban Intersections", 2017 IEEE Intelligent Vehicles Symposium (IV), Los Angeles, CA, USA, 2017, pp. 825-pp. 830.
Bouton et al., "Scalable Decision Making with Sensor Occlusions", 2018 IEEE International Conference on Robotics and Automation, May 21-25, 2018, pp. 2076-pp. 2081.
Brechtel et al., "Probabilistic Decision-Making under Uncertainty for Autonomous Driving using Continuous POMDPs", 2014 IEEE 17th International Conference on Intelligent Transportation Systems, Oct. 8-11, 2014, pp. 392-pp. 399.
Campbell et al., "Autonomous Driving in Urban Environments", Philosophical Transaction of The Royal Society, Philosophical Transactions, 2010, pp. 4649-pp. 4672.
Chong et al., "Autonomous Robot Driving Decision Strategy Following Road Signs and Traffic Rules", 2016 16th International Conference on Control, Automation and Systems (ICCAS 2016), Oct. 16-19, 2016, pp. 377-pp. 381.
Chung et al., "Safe Navigation of a Mobile Robot Considering Visibility of Environment", IEEE Transactions on Industrial Electronics, vol. 56, No. 10, Oct. 2009, pp. 3941-pp. 3950.

General Motors, 2018 Self-Driving Safety Report, 2018, pp. 1-pp. 33.
Gu et al., "A Motion Planning Algorithm Based on Uncertainty Prediction", 2013 International Conference on InformationScience and Cloud Computing, pp. 1-pp. 6.
Henriques et al., "High-Speed Tracking with Kernelized Correlation Filters", IEEE Transactions on Pattern Analysis and Machine Intelligence, vol. 37, No. 3, Mar. 2015, pp. 583-pp. 596.
Here, "HD Live Map Automotive Developer Guide", 2017, pp. 1-pp. 125.
Hoermann et al., "Entering Crossroads with Blind Comers", 2017 IEEE Intelligent Vehicles Symposium, Jun. 11-14, 2017, Redondo Beach, CA, pp. 727-pp. 732.
Hsiao et al., "Occlusion Reasoning for Object Detection under Arbitrary Viewpoint", IEEE Transactions on Pattern Analysis and Michine Intelligence, vol. 36, No. 9, Sep. 2014, pp. 1803-pp. 1815.
Kim et al., "Object Bounding Box-Critic NEetworks for Occlusion-Robust Object Detection in Road Scene", IEEE 2018 ICIP, pp. 1313-pp. 1317.
Lee et al., "Collision Risk Assessment for Possible Collision Vehicle in Occluded Area Based on Precise Map", 2017 IEEE International Conference on Intelligent Transportation System, pp. 1-pp. 6.
Levinson et al., "Towards Fully Autonomous Driving Systems and Algorithms", 2011 IEEE Intelligent Vehicles Symposium(IV), Baden-Baden, Germany, Jun. 5-9, 20177, pp. 163-pp. 168.
Li et al., "Real-Time Trajectory Planning for Autonomous", IEEE/ASME Transactions on Mechatronics, vol. 21, No. 2, Apr. 2019, pp. 740-pp. 753.
Li et al., "Trajectory Planning for Autonomous Ground Vehicles Driving in Structured", 2017 9th International Conference on Intelligenct Human-Machine Systems and Cybernectics, IEEE 2017, pp. 41-pp. 46.
Lim et al., "Hierarchical Trajectory Planning of an Autonomous", IEEE Transactions on Intelligent Transportation Systems, vol. 19, No. 2, Feb. 2018, pp. 613-pp. 626.
Ma et al., "A Two-level Path Planning Method for On-road Autonomous Driving", 2012 International Conference on Intelligent Systems Designs and Engineering Application, pp. 661-pp. 664.
Ma et al., "Efficient Sampling-Based Motion Planning for On-Road Autonomous Driving", IEEE Transactions on Intelligent Transportation Systems, vol. 16, No. 4, Aug. 2015, pp. 1961-pp. 1976.
Miller et al., "Team Cornell's Skynet Robust Perception and Planning in Urban Environment", Journal of Field Robotics, 2008, vol. 25, No. 8, pp. 493-pp. 527.
Noh, "Decision-Making Framework for Autonomous Driving at Intersections: Safeguarding Against Collision, Overly Conservative Behavior, and Violation Vehicles", IEEE Transactions on Industrial Electronics, vol. 66, No. 4, Apr. 2019, pp. 3275-pp. 3286.
Non Final Office Action dated Oct. 22, 2020 for U.S. Appl. No. 16/289,397, "Determining Occupancy of Occluded Regions", Gier, 10 pages.
Orzechowski et al., "Tackling Occlusions & Limited Sensor Range with Set-based Safety Verification", 2018, pp. 1-pp. 8.
Pan et al., "Robust and Accurate Object Tracking Under Various Types of Occlusions", IEEE Transactions on Circuits and Systems for Video Technology, vol. 18, No. 2, Feb. 2008, pp. 223-pp. 236.
The PCT Search Report and Written Opinion dated May 29, 2020 for PCT Application No. PCT/US2020/018676, 13 pages.
Pendleton et al., "Perception, Planning, Control and Coordination, for Autonomous Vehicles", MDPI, Machines 2017, 5, 6, pp. 1-pp. 54.
Sadou et al., "Occlusions in Obstacle Detection for Safe Navigation", 2004 IEEE Intelligent Vehicles Symposium, University of Parma, Jun. 14-17, 2004, pp. 716-pp. 721.
Seo et al., "A Perception Mechanism for Supporting Autonomous Intersection Handling in Urban Driving", 2008 IEEE/RSJ International Conference on Intelligent Robot and Systems, Spet 22-26, 2008, pp. 1830-pp. 1835.
Shang et al., "Improving Pedestrian Detection in Crowds with Synthetic Occlusion Images", 2018 IEEE, Tsinghuw National Lab for Info Sci. & Tech., pp. 1-pp. 4.

(56) References Cited

OTHER PUBLICATIONS

Song et al., "Intention-aware Decision Making in Urban Lane", 2018 IEEE International Conference on Vehicular Electronics and Safety (ICVES), Sep. 12-14, 2018, pp. 1-pp. 8.
Song et al., "Learning a Deep Motion Planning Model for Autonomous Driving", 2018 IEEE Intelligent Vehicles Symposium, Jun. 26-30, 2018, pp. 1137-pp. 1142.
Sonu et al., "Exploiting Hierarchy for Scalable Decision", 2018 IEEE Intelligent Vehicles Symposium, Jun. 26-30, 2018, pp. 2203-pp. 2208.
Sun et al., "Trajectory Planning for Vehicle Autonomous Driving with Uncertainties", 2014 International Conference on Informative and Cybernetics for Computational Social Systems (ICCSS), pp. 34 pp. 38.
Waymo, "Waymo Safety Report", 2018, pp. 1-pp. 43.
Wei et al., "A Prediction- and Cost Function-Based Algorithm for Robust Autonomous Freeway Driving", 2010 IEEE Intelligent Vehicles Symposium, Univeristy of California, San Diego, CA, Jun. 21-24, 2010, pp. 513-pp. 517.
Yu, et al., "Occlusion-Aware Risk Assessment for Autonomous Driving in Urban Environments", IEEE Robotics and Automation Letters, vol. 4, No. 2, Secotion III, Figures 2, 3, Sep. 2018, pp. 2235-2241.
Yu, et al., "Risk Assessment and Planning with Bidirectional Reachability for Autonomous Driving", arxiv.org, Cornell University Library, Sep. 2019, Section III; 7 pages.
Zhan et al., "A Non-Conservatively Defensive Strategy for Urban Autonomous Driving", 2016 IEEE 19th International Conference on Intelligent Transporation Systems, Nov. 1-4, 2016, pp. 459-pp. 464.

\* cited by examiner

_US 11,740,633 B2_

DETERMINING OCCUPANCY OF OCCLUDED REGIONS

CROSS REFERENCE TO RELATED APPLICATIONS

This is a continuation application which claims priority to commonly assigned, co-pending U.S. patent application Ser. No. 16/289,397, filed Feb. 28, 2019, which is fully incorporated herein by reference.

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects. However, conventional techniques for making such decisions can be overly conservative or can frequently brake when not needed, causing discomfort for passengers and uncertainty on behalf of persons in the surrounding environment regarding the autonomous vehicle's upcoming actions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
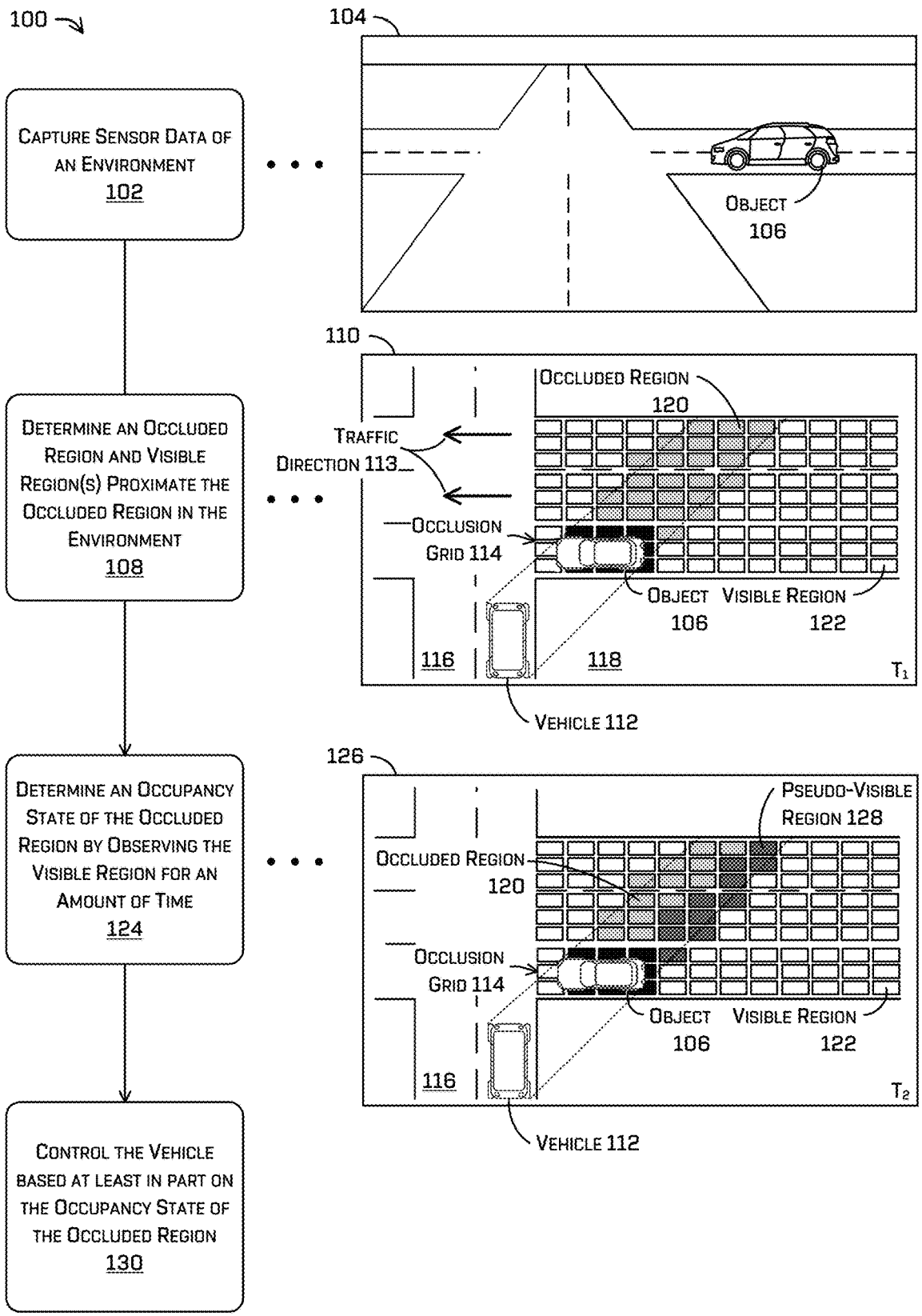
FIG. 1 is a pictorial flow diagram of an example process for capturing sensor data, determining an occluded region and visible region(s) proximate the occluded region in the environment, determining an occupancy state for the occluded region, and controlling the vehicle based at least in part on the occupancy state of the occluded region, in accordance with embodiments of the disclosure.

This disclosure is directed to determining a likelihood that a region that is not visible to sensors (e.g., an occluded region) is unoccupied by observing the occluded region over time. For example, the techniques herein can use knowledge of a history of a visible entry region proximate an occluded area to determine a certainty that there are no objects in the occluded area that would prevent a vehicle from safely traversing a portion of the environment. For example, sensors of a vehicle (such as an autonomous vehicle) can capture sensor data of an environment, which may include objects separate from the vehicle, such as other vehicles, pedestrians, buildings, vegetation, and so forth. Sensor coverage of the environment may be limited (occluded) based on obstructions in the environment. At a first time, an occupancy of an occluded region can be unknown. By determining and observing a region of entry into the occluded region (e.g., based on a direction of travel), an occlusion reasoning system can determine a likelihood that a portion of the occluded region is unoccupied by a dynamic object. For example, the occlusion reasoning system can progressively determine that occluded regions are "pseudo-visible regions" based on observing an area for a period of time and/or by assuming that any dynamic object in the occluded region (if there were any dynamic object) has traveled out of a portion of the occluded region. The occlusion reasoning system can provide information regarding the state of occluded regions to the planning system about the likelihood that a region is free of dynamic objects, for use in generating trajectories for a vehicle.

The occlusion reasoning system can be implemented in the case of static occluded regions and/or moving occluded regions. In the static occluded region, a location of an occluded region remains static or stationary over time. In some cases, a static occluded region can be caused by a scenario in which both a vehicle (e.g., comprising sensors) and an occluding object in the environment are stationary. As noted above, the occlusion reasoning system can assume that the occupancy of the occluded region is unknown. However, over time, and based on a direction of travel associated with a drivable area, a threshold amount of time, and/or a threshold speed, the occlusion reasoning system can determine that portions of the occluded region are likely unoccupied. The direction of travel may correspond to a known direction of travel on a map, such as a flow of traffic in a drivable region. The threshold amount of time may correspond to a representative amount of time that a vehicle spends in a particular scenario, such as an average amount of time that a vehicle spends stopped at a junction, an amount of time to accelerate to the speed limit, an amount of time to decelerate from a current speed to a full stop, and so forth. The threshold speed may correspond to a minimum speed that a reasonable dynamic object is expected to travel in the environment. For instance, the threshold speed may be an average walking speed of a pedestrian (e.g., 1.5 meters/second) which would encompass objects moving faster than the minimum speed, such as cars and bicycles traveling along a drivable region. Furthermore, the threshold speed and/or the threshold time may be based on the size of the occluded region, a distance from the occluded region to the vehicle, map data (e.g., a speed limit associated with a drivable region), historical data, and so forth.

In a moving occluded region, a location and/or size of an occluded region may change over time. In some instances, the moving occluded region may result from motion of the vehicle and/or an object in an environment causing an occluded region with respect to sensors of the vehicle. In the case of a moving occluded region, the vehicle can reason that a previously visible (but now occluded) area that was free of dynamic objects is still free of dynamic objects. This reasoning can allow the vehicle to make decisions about the occupancy of regions of the environment, which in turn can be used to determine how to traverse the environment more rapidly and/or with more certainty than conventional planning techniques.

Sensor data captured by the vehicle can include lidar data, radar data, image data (RGB, intensity, depth, infrared, ultraviolet, etc.), time of flight data, sonar data, and the like. In some cases, the sensor data can be provided to a perception system configured to determine a type of an object (e.g., vehicle, pedestrian, bicycle, animal, parked car, tree, building, and the like) in the environment. Further, the perception system can determine, based on the sensor data, movement information about the object in the environment.

The sensor data captured by the vehicle representing objects in the environment can be used to generate occluded regions associated with the object in the environment relative to the vehicle. For example, the occlusion reasoning system can determine an occlusion grid associated with occluded regions related to locations of objects as time passes. Techniques such as ray casting and/or projection can be used to determine which area(s) of the environment represented by the occlusion grid are occluded with respect to a location of the vehicle over time. In some examples, different techniques for determining an occlusion can be used based on various sensor modalities. As a non-limiting example, ray casting may be used to determine occlusions for lidar sensors, whereas image projections using camera matrices may be used for determining occlusions of image sensors. The occlusion grid can be three-dimensional and can represent a prediction of the object in voxels that describe a volume of the object in the environment. Techniques for generating an occlusion grid can be found, for example, in U.S. patent application Ser. No. 16/011,436 titled "Occlusion Aware Planning" and filed Jun. 18, 2018, which is incorporated by reference herein in its entirety.

As the vehicle traverses the environment, the occlusion reasoning system can use the sensor data and map data of the surrounding environment to detect objects in the environment and determine corresponding occluded regions caused by such objects. In many cases, occluded regions contain objects that are relevant to decision-making processes of the vehicle, such as whether to cross a road, whether to traverse a crosswalk, which lane of traffic to enter, how fast to accelerate/decelerate, and so forth. In some examples, an occluded region may have a visible entry region adjacent to or proximate the occluded region, which may be used for making decisions on how to control the vehicle. The occlusion reasoning system may determine the entry region using the map data. For example, the map data may indicate a drivable region (e.g., lanes in a road) and/or a direction of traffic associated therewith, and if a visible region proximate the occluded region is present, the vehicle can designate an entry region into the occluded region based on an assumption that traffic will enter the occluded region in the particular direction at that location. Similarly, a region that corresponds to the exit of the occluded region (based at least in part on the direction of travel) can be referred to as an "exit region."

In the case of a static occluded region, the occlusion reasoning system can determine that at least a portion of the occluded region is likely free of a dynamic object based on the sensor data and a threshold speed and/or a threshold time associated with the occluded region. For instance, the threshold speed may be associated with a walking pace of a pedestrian, such as 1.5 m/s, although of course any suitable threshold speed may be used. In some instances, the threshold time may correspond to an amount of time the occlusion reasoning system can observe the occluded region before determining an occupancy of a portion of the occluded region. Regardless of the threshold speed and/or threshold time used, the occlusion reasoning system can observe and/or track any object moving faster than the threshold speed that passes through the occluded region, and can control the vehicle accordingly. In many cases, objects moving slower than the threshold speed will not affect many of the decisions used to control the vehicle, and thus the vehicle can treat such objects as "non-moving." In an example, a bicyclist may be slowly approaching an intersection, moving only just fast enough to prevent the bicyclist from removing her feet from her pedals, but slower than the threshold speed used by the vehicle for analyzing the presence of unknown objects in occluded regions. Assuming that the bicyclist is located in an area occluded to a vehicle that has also approached the intersection, the vehicle may proceed safely through the intersection regardless of the knowledge of the presence of the bicyclist, because it is highly unlikely that the bicyclist will affect the vehicle's decision whether to cross the intersection at her current speed.

In some examples, the occlusion reasoning system may not rely upon the same assumptions for moving occluded regions as the stationary occluded regions relating to minimum speed of relevant dynamic objects. Instead, the occlusion reasoning system may rely upon knowledge of an entrance into an occluded area as the size or dimension of the occluded area changes over time, while either the vehicle or the occluding object moves. For instance, if a portion of the visible area does not include a dynamic object at a first time, and no dynamic object enters the entry region as time passes, the vehicle can assume that the portion of the area that was visible at the first time does not include a dynamic object at a second later time, even if the once-visible area is now occluded. The portion of the previously visible area may be considered "pseudo-visible," meaning that the vehicle can determine with a relatively high degree of certainty whether the area contains dynamic objects relevant to decision-making on behalf of the vehicle. In some examples, a determination on pseudo-visibility may be based on determining that a probability that an occluded area is free of a dynamic object meets or exceeds a threshold value, e.g., 51% certainty, 75% certainty, 90% certainty, etc. Being able to classify even a portion of an occluded area as pseudo-visible allows the vehicle to execute instructions earlier than techniques that require all regions to be visible at the same time before execution.

The techniques discussed herein can improve a functioning of a computing device in a number of ways. As mentioned above, the occlusion reasoning system may classify portions of occluded regions as pseudo-visible and consequently may execute decisions earlier than techniques that require all regions to be visible and evaluated, thus saving processing and computing resources in analyzing the surrounding environment. In some cases, the dynamic nature of the described techniques (e.g., controlling the vehicle based in part on visible or pseudo-visible regions) require fewer rules to be enumerated for generating and/or selecting trajectories for vehicles such as autonomous vehicles to traverse an environment. By controlling the vehicle based in part on pseudo-visible portions of occluded regions, the safety of the vehicle can be improved by allowing the vehicle to adapt and react to its surroundings, rather than requiring the vehicle to follow set instructions, especially when a situation arises in which there is not a specific rule present. Further, controlling the vehicle based in part on pseudo-visible portions of occluded regions can reduce processing resources, as the number of enumerated rules for every driving situation the vehicle may encounter would be virtually infinite. Further, techniques for designating pseudo-visible regions of occluded regions over time can increase a confidence that dynamic object may not interfere or collide with a vehicle, which may improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In another example, the techniques can be utilized in an aviation or nautical context, or in any system involving objects or entity that may be associated with behavior that is unknown to the system. Additionally, the techniques described herein can be used with real data (e.g., captured using sensor(s)), simulated data (e.g., generated by a simulator), or any combination of the two.

FIG. 1 is a pictorial flow diagram of an example process 100 for capturing sensor data, determining an occluded region and visible region(s) proximate the occluded region in the environment, determining an occupancy state for the occluded region, and controlling the vehicle based at least in part on the occupancy state of the occluded region, in accordance with embodiments of the disclosure.

At operation 102, the process can include capturing sensor data of an environment. In some examples, the sensor data can be captured by one or more sensors on a vehicle (autonomous or otherwise). For example, the sensor data can include data captured by one or more of a lidar sensor, a radar sensor, an image sensor, a time of flight sensor, a sonar sensor, and the like.

An example illustrates image data 104 captured in the operation 102. For example, the image data 104 can represent an object 106 in the environment. In some examples, the object 106 can represent a vehicle, a pedestrian, an animal, and the like. In some instances, the sensor data captured in the operation 102 can be used to determine information about the object 106, including but not limited to, a type of the object (e.g., semantic information indicating a classification of the object, such as a vehicle, pedestrian, bicycle, animal, and the like). In some instances, the operations can include determining the type of the object 106, a bounding box associated with the object 106, segmentation information associated with the object 106, and/or movement information associated with the object, and any uncertainties associated therewith, as discussed herein. The operation 104 can additionally include accessing map data representing the environment.

At operation 108, the process can include determining an occluded region and visible region(s) proximate the occluded region in the environment. The terms "occluded" and "visible" as used herein may represent a probability that the areas of the environment are occluded and/or visible to sensors of a vehicle (e.g., above a threshold). An example 110 illustrates a vehicle 112 that has approached an intersection of a drivable region 116 in the environment at a first time $T_1$. The drivable region 116 includes a direction of traffic 113 approaching a junction of the drivable region 116 from the right. In some examples, the vehicle 112 can represent an occluded area of the environment using an occlusion grid 114, which may be stored in connection with map data of the environment, or can be dynamically generated based on objects in the environment, given sensor ranges, fields of view, and/or the map data. The occlusion grid 114 can include a plurality of occlusion fields (e.g., the boxes pictured in the occlusion grid 114), which can represent discrete areas of the environment, such as drivable regions. In some examples, an occlusion field can indicate an occlusion state (e.g., indicating whether the location is visible to one or more sensors of an autonomous vehicle) and an occupancy state (e.g., indicating whether the location is occupied by an object such as a vehicle, pedestrian, animal, etc.). The occlusion state and/or the occupancy state can be determined using lidar data, radar data, and/or image data captured by the autonomous vehicle. Additional details for generating an occlusion grid can be found for example, in U.S. patent application Ser. No. 16/011,436 titled "Occlusion Aware Planning" and filed Jun. 18, 2018, which is incorporated by reference herein in its entirety.

For the purpose of discussion, the vehicle 112 capturing (or utilizing) the sensor data can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 112 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 112 are described throughout this disclosure.

The object 106 is also located in the environment, as shown in the illustrated example 110. In some examples, the object 106 can represent a vehicle, a pedestrian, a bicycle, an animal, and the like. The environment illustrated in the example 110 can include a drivable region 116 and a non-drivable region 118. In some examples, the drivable region 116 can include any area of an environment where the vehicle 112 can (legally) traverse (e.g., a road, a driveway, a parking lot, etc.). In some examples, the non-drivable region 118 can represent areas of an environment where the vehicle 112 cannot legally or physically traverse (e.g., a sidewalk, a building, a park, etc.).

In some examples, the occlusion grid 114 can be based at least in part on localizing the vehicle 112 in the environment and accessing map data associated with the environment. For example, map data can comprise map elements such as lane elements indicating a region of the environment corresponding to the drivable region 116. Additional examples of map elements can include, but are not limited to, one or more of a building or structure, a crosswalk element, a bike lane element, an intersection element, a lane divider element, a traffic light element, a stop sign element, a stop line element, a yield sign element, a yield line element, a parking lane element, a driveway element, a speed bump element, jay walking regions (e.g., a virtual crosswalk), trajectory waypoints (e.g., known trajectories), passenger pickup points, a sign location element, a geofence element, and the like. In some cases, a predicted trajectory associated with an object can be based on the map data.

As mentioned above, the occlusion grid 114 can represent an occlusion state and/or an occupancy state for the occlusion fields of the occlusion grid 114. Additionally, in some examples, the occupancy state may further comprise an "indeterminate" state, which is to say that, based on the available data, it may be currently unknown whether the occlusion field is occupied or not. An indeterminate state may be caused, for example, by an object that obstructs a portion of the environment from view of the sensors of the vehicle 112, such as the object 106. In the example 110, occlusion fields of the occlusion grid 114 that are obstructed (occluded) by the object 106 are colored light gray, indicating an occluded region 120. Occlusion fields of the occlusion grid 114 that are occupied are colored black (e.g., at least partially covered by the object 106). Occlusion fields of the occlusion grid 114 colored white indicate a visible region 122.

In this example 110, at least a portion of the visible region 122 is proximate the occluded region 120. The occluded region 120 and the visible region 122 in the example 110 are shown only on the drivable region 116 for clarity; the occlusion grid 114 and accompanying occluded regions, occupied regions, and/or visible regions may also extend to non-drivable regions 118 as well. For example, an occlusion grid may extend onto a non-drivable region such as a sidewalk, to capture information relevant to decision-making for the vehicle related to pedestrians, bicycles, vehicles entering/exiting a drivable region via a driveway that spans the sidewalk, and so forth.

The vehicle 112 may designate the visible region 122 as an "entry region" into the occluded region based on knowledge (e.g., derived from the map data) that dynamic objects will approach the occluded region 120 from the right. In some examples, the entry region of the visible region 122 may be continuous with the occluded region 120, such that a first extent of the occluded region 120 corresponds to a second extent of the entry region. When evaluating a drivable region such as the drivable region 116, the second extent of the entry region may correspond to the drivable region 116 associated with the occluded region 120. In at least some examples, such an entry region requires contiguous visible occlusion fields (e.g., having at least one adjacent side of the respective occlusion fields in common) from one side of the drivable surface to the other side along a boundary between occluded and visible regions, where the boundary corresponds to the incoming direction of travel. A similar technique can be performed to determine an exit region, with the exception that the boundary between occluded and visible regions corresponds to an outgoing direction of travel from the occluded region. If an entrance and exit region are identified on either side of an occluded region, reasoning about dynamic objects within the occluded region can be performed. In such examples, dynamic objects that are traveling along the drivable region 116 are likely to continue along the drivable region 116 from the entry region into, and through, the occluded region 116, and exit via the exit region.

At operation 124, the process can include determining an occupancy state of the occluded region by observing the visible region for an amount of time. An example 126 illustrates determining a pseudo-visible region 128 in the environment at a second time $T_2$. For example, the pseudo-visible region 128 can correspond to occlusion fields of the occlusion grid 114 which the vehicle 112 has determined, to a particular degree of certainty, to be unoccupied by a dynamic object based on observing the visible region 122 from time $T_1$ to time $T_2$. The determination that the pseudo-visible region 128 is unoccupied may also be based on map data of the environment indicating that the direction of travel of the drivable region 116 approaches the occluded region 120 from the right, and that the visible region 122 is an entry region as just described. In some examples, without any dynamic objects entering the occluded region 120 from the entry region, the vehicle 112 can continue to determine that the occlusion fields of the occlusion grid 114 are pseudo-visible along a direction of travel associated with the area of the occlusion grid as time passes based on a threshold speed and/or a threshold amount of time, until all of the occlusion fields are considered pseudo-visible. That is, occlusion fields closest to an entry region may be designated as pseudo-visible before occlusion fields that are closer to an exit region.

Although generally depicted as being in an x-direction and a y-direction for clarity in the example 126, the occluded region 120 and/or the visible region 122 may also represent occlusion information associated with a z-direction component, which may correspond to a height of the object 106, for instance. In another example, occlusion information may be associated with a z-direction component corresponding to terrain of the surrounding environment, such as hills or valleys, or height of objects that may be occluded but are relevant to trajectory determinations, such as stop lights or train crossing signals.

At operation 130, the process can include controlling the vehicle based at least in part on the occupancy state of the occluded region. For example, if the occupancy state for the occluded region 120 indicates that the occluded region is likely free of dynamic objects (e.g., by having all columns and/or rows of the occlusion fields in the occluded region 120 designated as "pseudo-visible"), the vehicle 112 may traverse the environment based on a trajectory for the vehicle 112 to efficiently and safely reach a destination.

In another example, if the occupancy state for the occluded region 120 indicates that a dynamic object is present in the occluded region (or, otherwise, that there is insufficient information to determine whether the occluded region is free of dynamic objects), the vehicle 112 may wait for the object to reappear (e.g., to be sensed by the vehicle's sensors) from the occluded region 120 and/or attempt to move into a position to afford a greater percentage of visibility to the sensors. Once the dynamic object has reappeared, the vehicle 112 may respond accordingly, such as by waiting for the object to clear an area of the intended trajectory before continuing to the vehicle's intended destination. In at least some examples, once an object enters an occluded region, reasoning about pseudo-visible space may be re-evaluated. As a non-limiting example, once an object enters the occluded region, all occlusion fields in the occlusion grid 114 may be marked as occluded and pseudo-visible determinations may be recomputed.

While the occupancy state can be used in various ways to control a vehicle, other inputs may also contribute to selecting controlling the vehicle (e.g., safety systems, user inputs, and so forth). For example, in some examples, an occupancy state can be used as one of many costs associated with controlling a vehicle to traverse an environment. Examples of additional costs used to control a vehicle can include, but are not limited to, one or more of a steering cost (e.g., a cost based on steering angles for the vehicle), a reference cost (e.g., a cost based on a distance of a trajectory from a reference line), an acceleration cost (e.g., a cost based on a maximum acceleration for the vehicle), a braking cost (e.g., a cost based on a minimum braking time), and the like.

Additional details of occluded regions, entry regions, pseudo-visible regions, and occupancy states are discussed throughout this disclosure.

Figure 2:
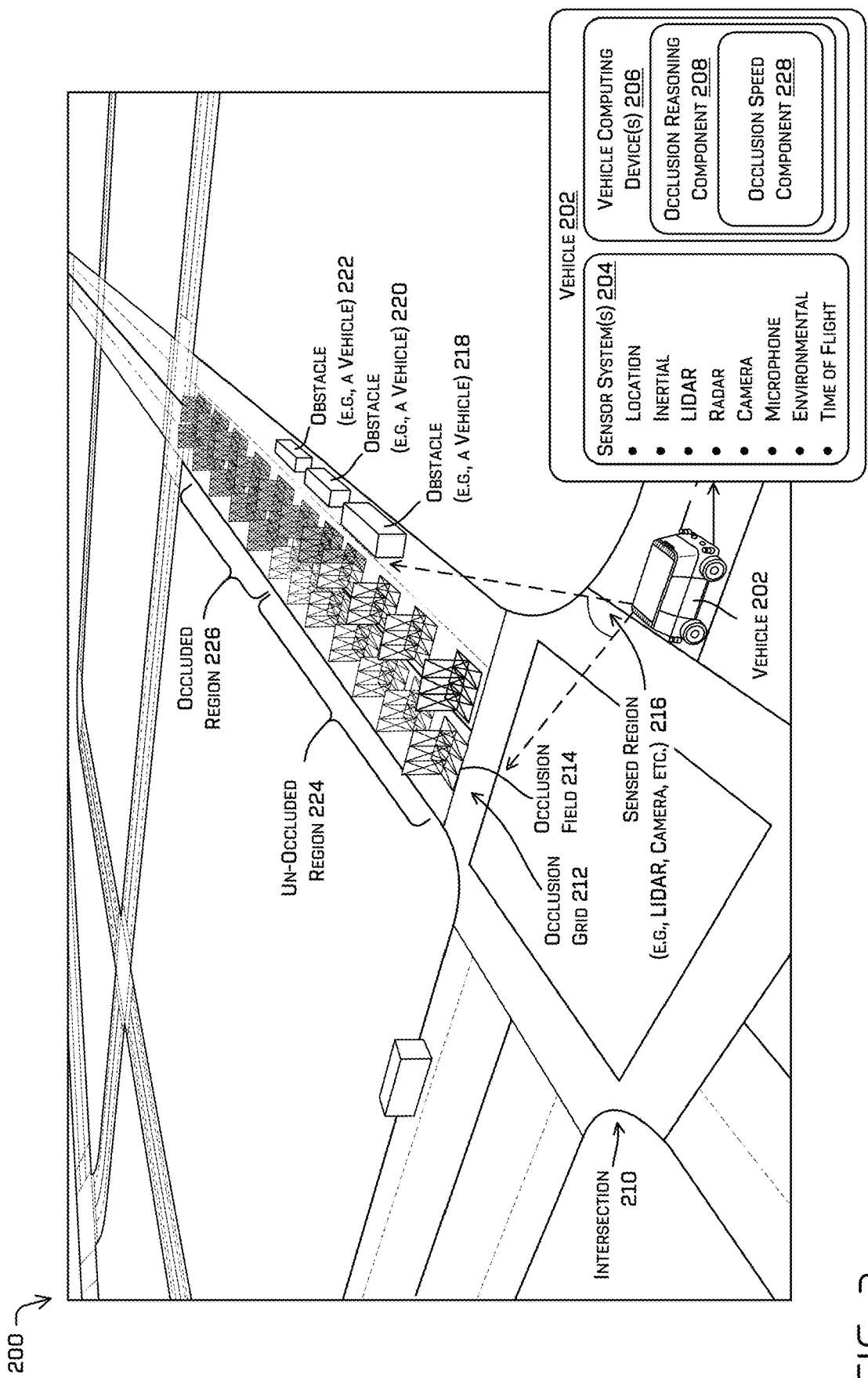
FIG. 2 is an environment illustrating a perspective view of an example occlusion grid comprising a plurality of occlusion fields in an environment, and illustrating a vehicle including an occlusion reasoning component to determine occluded and un-occluded regions of the occlusion grid resulting from obstacles, in accordance with embodiments of the disclosure.

FIG. 2 is an environment 200 illustrating a perspective view of an example occlusion grid comprising a plurality of occlusion fields in an environment, and illustrating a vehicle including an occlusion reasoning component to determine occluded and un-occluded regions of the occlusion grid resulting from obstacles, in accordance with embodiments of the disclosure.

As illustrated, the environment 200 can include a vehicle 202 that includes one or more sensor system(s) 204 capturing data representing the environment 200.

In at least one example, and as noted above, the vehicle 202 can be associated with sensor system(s) 204 that can be disposed on the vehicle 202. The sensor system(s) 204 can include light detection and ranging (lidar) sensors, radio detection and ranging (radar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time-of-flight sensors (e.g., RF-modulated light sources, range gated imagers, direct time-of-flight imagers, etc.), etc. The sensor system(s) 204 can generate sensor data, which can be utilized by vehicle computing device(s) 206 associated with the vehicle 202.

In at least one example, the vehicle computing device(s) 206 can utilize sensor data in an occlusion reasoning component 208. For example, the occlusion reasoning component 208 can access occlusion data and/or map data to determine occlusion state(s) and occupancy state(s) of occlusion fields in an occlusion grid.

By way of example, and without limitation, the vehicle 202 in the environment 200 is approaching an intersection 210. In some examples, the vehicle 202 can access map data and can determine that an occlusion grid 212 is associated with the intersection 210. In some examples, the intersection 210 can represent an intersection where the vehicle 202 is required to yield to one-way traffic entering the intersection 210.

The occlusion grid 212 can include a plurality of occlusion fields dividing a portion of the environment 200 into discrete regions. Though depicted as homogeneously sized regions for illustration, the occlusion fields need not be so limiting and can have non-uniform dimensions (e.g., larger or smaller based at least in part on a distance from vehicle 202, type of drivable area (e.g., city street, highway, etc.) or the like). In some examples, an occlusion field 214 can represent an occlusion state (e.g., an indication of whether the occlusion field 214 is within a sensed region 216 associated with one or more sensors of the vehicle 202). As can be understood, the environment 200 may include one or more obstacles 218, 220, and 222 that cause a portion of the occlusion grid 212 to fall outside of the sensed region 216 of the vehicle 202. Accordingly, an un-occluded region 224 of the occlusion grid 212 can represent a region of the occlusion grid 212 that can be "seen" by the vehicle 202, which is to say, the vehicle 202 can capture sensor data representing the un-occluded region 224. Similarly, an occluded region 226 can represent a region of the occlusion grid 212 that cannot be "seen" by the vehicle 202 (e.g., based on, for example, an expected sensor range, field of view, corresponding map data, and the like). In some examples, the occlusion grid 212 may be generated based on time and/or information necessary to perform a maneuver (e.g., crossing a lane given an estimate speed of oncoming traffic results in a minimum visibility distance of the oncoming traffic lane). As illustrated in FIG. 2, the occlusion fields in the occluded region 226 are shaded gray to represent the lack of sensor data corresponding to that region, while the un-occluded region 224 is not shaded.

In some instances, when an occlusion field is occupied by an object, the occlusion field can store additional metadata indicating an identity of the object as well as data indicative of the path of the object through the occlusion grid. For example, an occlusion speed component 228 of the occlusion reasoning component 208 may determine the path of the object through the occlusion grid, as well as a speed of the object as the object travels along the path through the occlusion grid. Furthermore, the occlusion speed component 228 may compare the speed of the object to one or more threshold speeds relevant to making decisions on how to control the vehicle 202. In some examples, the occlusion speed component 228 may also use a threshold speed when identifying and/or evaluating an occluded region in the environment, such as to determine whether dynamic objects are present in areas otherwise obstructed to the sensor system(s) 204 of the vehicle 202.

Additional details directed to identifying and evaluating a static occluded region are discussed below in connection with FIGS. 3 and 4, while additional details directed to identifying and evaluating a moving occluded region are discussed below in connection with FIGS. 5A and 5B.

Figure 3:
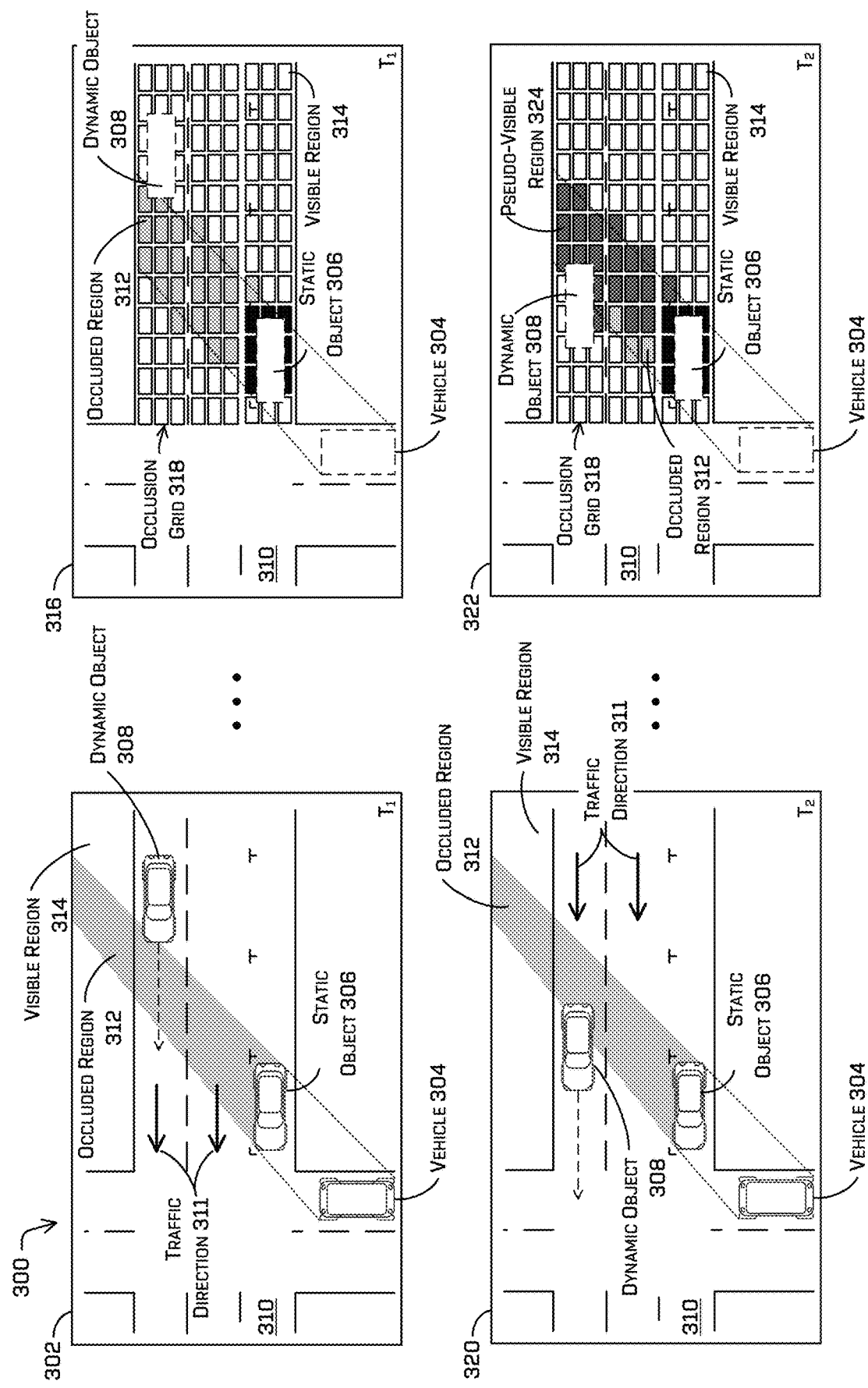
FIG. 3 is an example of identifying a static occluded region, and a dynamic object passing from one side to another side of the static occluded region, in accordance with embodiments of the disclosure.

FIG. 3 is an example of identifying a static occluded region, and a dynamic object passing from one side to another side of the static occluded region, in accordance with embodiments of the disclosure.

An environment 302 includes a vehicle 304 (e.g., an autonomous vehicle), a first static object 306 (e.g., another vehicle that is stationary or parked), and a second dynamic object 308 (e.g., another vehicle that is moving along a drivable region 310 in a traffic direction 311). As illustrated, the environment 302 may represent an initial time (e.g., $T_1$). At the initial time $T_1$, the static object 306 may obfuscate a portion of the environment 302 from sensors of the vehicle 304, causing an occluded region 312 indicated by light gray shading. The vehicle 304 may be able to sense a number of visible regions, such as visible region 314, that are not occluded. The traffic direction 311 may be determined using map data of the environment 302, and/or may be determined by perception data of the environment 302 received from sensors of the vehicle 304 which is analyzed to determine the traffic direction 311 (e.g., observing which direction vehicles are traveling along the drivable surface 310), for instance.

In some examples, an occlusion reasoning system of the vehicle 304 may use map data and/or data from sensors of the vehicle 304 to generate an environment representation 316 of the environment 302 at the initial time $T_1$. The environment representation 316 includes representations of the vehicle 304, the static object 306, the dynamic object 308, and the drivable region 310.

As discussed above, the vehicle 304 may generate an occlusion grid 318 that includes a plurality of occlusion fields representing discrete areas of the environment 302. In some examples, an occlusion field can indicate an occlusion state (e.g., indicating whether the location is visible to one or more sensors of an autonomous vehicle, whether the location is occluded to the sensors, whether the location is out of range of the sensors, etc.) and an occupancy state (e.g., indicating whether the location is occupied by an object such as a vehicle, pedestrian, animal, etc.). The occlusion grid 318 can be generated from map data of the environment, and the occlusion reasoning system can use data from sensors of the vehicle 304 to determine the states of the occlusion fields.

For example, the occlusion reasoning system of the vehicle 304 may use map data of the environment to generate the occlusion fields of the occlusion grid 318 corresponding to the drivable region 310. The occlusion reasoning system of the vehicle 304 may also use one or more sensors to identify the static object 306, and designate occlusion fields where the static object 306 is detected as "occupied" (e.g., indicated by black shaded occlusion fields). The occlusion reasoning system may also determine that the static object 306 prevents the one or more sensors from viewing the occluded region 312. Based on this determination, the occlusion reasoning system may assign an indication of the occlusion fields included in the occluded region 312 as "occluded" and/or "indeterminate," as the occlusion reasoning system cannot say with certainty whether the occlusion fields in the occluded region 312 are occupied or not.

The occlusion reasoning system of the vehicle 304 may also use the map data to determine a direction of traffic associated with the drivable region 310. In the example 300, the direction of travel moves from right to left, as indicated in the environment 302 by the dynamic object 308. Based on the direction of travel associated with the drivable region 310, the occlusion reasoning system of the vehicle can designate at least a portion of the visible region 314 as an entry region into the occluded region 312. In some instances, an entry region, by definition, must span all possible entries into the occluded region. Spanning may be determined by determining a portion of contiguously connected occlusion fields (e.g., an occlusion field having at least one side in common with another, adjacent occlusion field) which are visible that connect a first side of the drivable surface to the other side along a boundary of the occluded region 312 in an entry region, based on the direction of traffic. By spanning all possible entries into the occluded region, the entry region provides the vehicle with a higher degree of certainty about whether a dynamic object is present in the occluded region (e.g., there is no occlusion field which may occlude a dynamic entity entering the occluded region 312 along the direction of travel of traffic). By designating the entry region, the vehicle 304 can determine, to a relatively high degree of certainty, that dynamic objects will only enter the occluded region 312 via the visible region 314, and will continue through the occluded region 312 in the same general direction. The occlusion reasoning system of the vehicle 304 may then provide this information to a planning system of the vehicle 304, which may be used make decisions to control the vehicle 304. Similar techniques may be applied to determine an exit region (e.g., a region which spans a second boundary of the occluded region 312 on an exit side with respect to the direction of traffic through the occluded region 312). In at least some examples, if an entry and/or exit region are not identified, alternative control schemes may be adopted for operating the vehicle given the known occlusions.

An environment 320 corresponds to the environment 302 at a second time $T_2$, after the initial time $T_1$. As shown, both the vehicle 304 and the static object 306 have remained stationary from the initial time $T_1$ to the second time $T_2$, and therefore the occluded region 312 remains the same, or "static." The dynamic object 308 has progressed along a trajectory to traverse the drivable region 310 between the initial time $T_1$ and the second time $T_2$.

Additionally, in some examples, the occlusion reasoning system of the vehicle 304 may use map data and/or data from sensors of the vehicle 304 to generate an environment representation 322 of the environment 320 at the second time $T_2$. The environment representation 322 includes representations of the vehicle 304, the static object 306, the dynamic object 308, and the drivable region 310.

The occlusion grid 318 is also represented in the environment representation 322. As time progresses from the initial time $T_1$ to the second time $T_2$, the occlusion reasoning system of the vehicle 304 can designate the occlusion fields previously designated as indeterminate as being "pseudo-visible." For instance, at the initial time $T_1$ the sensors of the vehicle 304 are able to detect the dynamic object 308 in the entry region of the visible region 314. Then, at the second time $T_2$, the sensors of the vehicle 304 are able to detect the dynamic object 308 reappearing on the other side of the occluded region 312. Based on these observations of the static occluded region and the entry region associated with the static occluded region, the vehicle 304 can assume, to a relatively high degree of certainty, that no dynamic objects are present in the lane of the drivable region 310 occupied by the dynamic object 308 within the occluded region 312. Such a designation may be made by, for example, feature matching or through the use of embedding to determine the object that entered the dynamic region is the same that exited. In at least some examples, dynamic and/or kinematics of the observed entity may be used to determine pseudo-visible occlusion fields. In such examples, if the vehicle was entering at a speed of 15 m/s, occlusion fields in the row in which the vehicle is traveling may be designated as pseudo-visible in order from right to left (or in the direction of traffic) at a rate of 15 m/s (based on the length of the fields). For example, the occlusion reasoning system may assume that the dynamic object 308 passed through the occluded region 312 without coming into contact with another object present in the occluded region 312. The occlusion reasoning system of the vehicle 304 may therefore designate the occlusion fields of the occlusion grid 318 traversed by the dynamic object 308 as a pseudo-visible region 324 (indicated by dark gray blocks), and use this information to control the vehicle 304 accordingly. In at least other examples, a dynamic object which enters the occluded region may "reset" a state of the occlusion fields to "indeterminate" and similar processing as below may be used to mark the occlusion fields as pseudo-visible.

In some examples, the occlusion reasoning system of the vehicle 304 may also, or alternatively, use a minimum threshold speed and/or a threshold time to designate occlusion fields of the occlusion grid 318 as pseudo-visible. The threshold speed may correspond to a minimum speed that a reasonable dynamic object is expected to travel in the environment. For instance, the middle lane of the drivable region 310 does not have a dynamic object passing from the visible region 314 through the occluded region 312 to use as a reference for pseudo-visibility. In some cases, there may be a dynamic object within the occluded region moving at a slower speed than the dynamic object 308 that is still relevant to making decisions to control the vehicle 304. To account for such objects, the vehicle may use a minimum threshold speed, such as an average speed of a walking pedestrian (e.g., 1.5 m/s) to change the designation of the occlusion fields in the occluded region 312 from indeterminate to pseudo-visible as time passes and beginning at the location of the entry region. In at least some examples, differing minimum threshold speeds may be defined (e.g., increased or decreased based on, for example, a distance to vehicle 304). Continuing to observe the visible region 314 from the initial time $T_1$ to the second time $T_2$, the occlusion reasoning system may change the designation of the occlusion fields from indeterminate to pseudo-visible from the entry region through the occluded region 312 for as long as no dynamic objects enter the occluded region, or until all of the occlusion fields in the occluded region 312 are pseudo-visible. As a non-limiting example, if each occlusion field has a length of 1.5 m, a dynamic object moving at the minimum threshold speed of 1.5 m/s would take is to pass through each occlusion field. In such an example, occlusion fields would be marked as "pseudo-visible" every second in order from the rightmost occlusion field per row through the occluded region 312 and to the exit region. Once all occlusion fields are marked as pseudo-visible (or otherwise visible and accounted for), the vehicle 304 may plan a path across the intersection (including sending an alert to a human driver (e.g., in an advanced driver-assistance system) to indicate that it is likely safe to proceed).

As noted above, setting the threshold speed to an average speed of a walking pedestrian (e.g., 1.5 m/s) allows the sensors of the vehicle 304 to detect any dynamic objects moving through the occluded region at a faster pace in the direction of travel. In many cases, objects moving slower than the threshold speed will not affect many of the decisions used to control the vehicle, and thus the vehicle can treat such objects as "non-moving." However, should the vehicle 304 detect a dynamic object moving slower than the threshold speed, the vehicle 304 may alter its trajectory accordingly. Further, while a threshold speed of 1.5 m/s is described in various examples herein, any suitable speed may be used as a minimum threshold speed.

Figure 4:
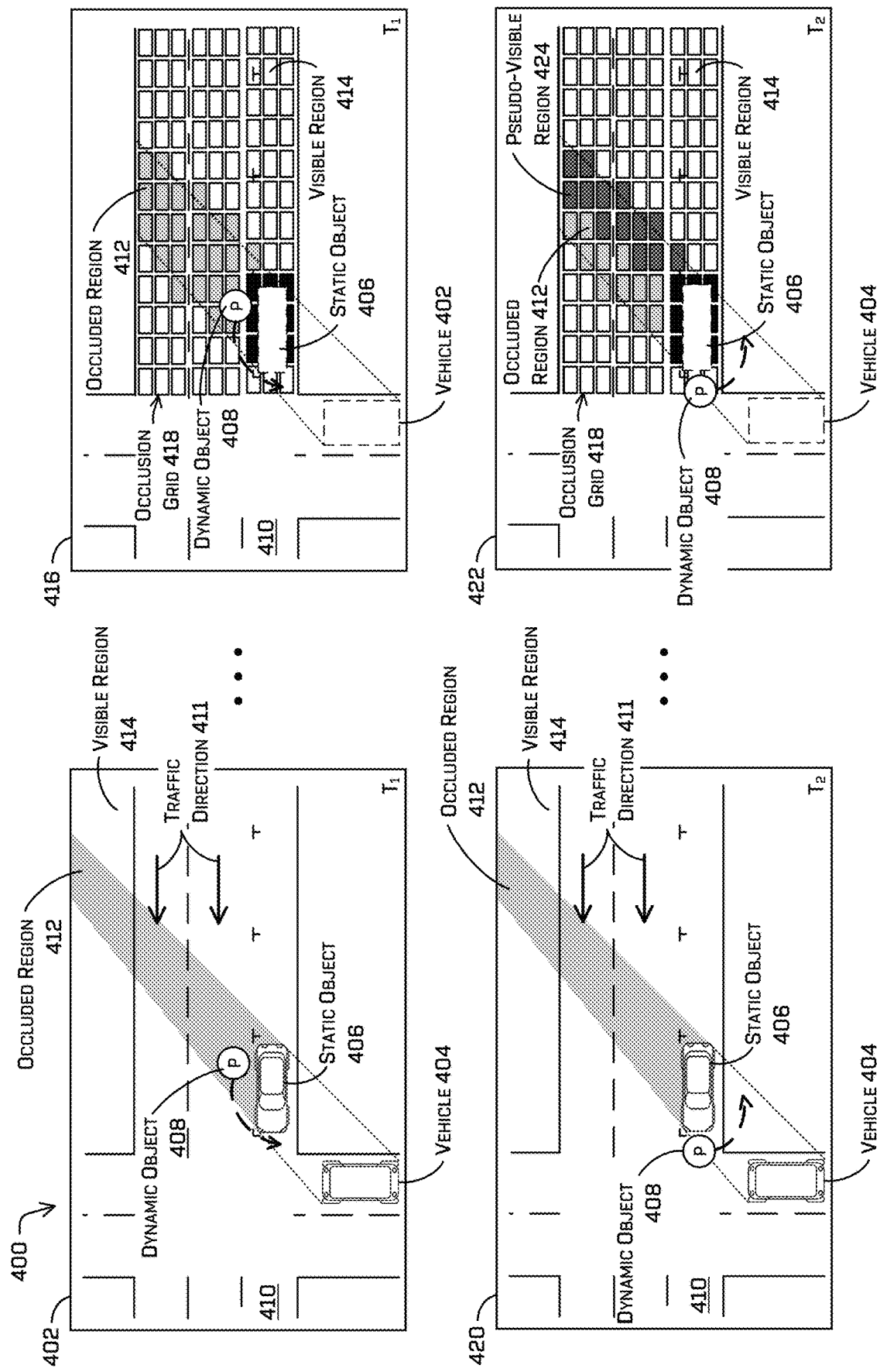
FIG. 4 is an example of identifying a static occluded region and a dynamic object exiting the occluded area of the static occluded region, in accordance with embodiments of the disclosure.

FIG. 4 is an example of identifying a static occluded region and a dynamic object exiting the occluded area of the static occluded region, in accordance with embodiments of the disclosure.

An environment 402 includes a vehicle 404 (e.g., an autonomous vehicle), a first static object 406 (e.g., another vehicle that is stationary or parked), and a second dynamic object 408 (e.g., a pedestrian who has just exited the static object 406 onto a drivable region 410; also labeled "P"). Similar to the drivable region 310 of FIG. 3, the drivable region 410 is associated with a traffic direction 411 from right to left. The traffic direction 411 may be determined using map data of the environment 402, and/or may be determined by perception data of the environment 402 received from sensors of the vehicle 404 which is analyzed to determine the traffic direction 411 (e.g., observing which direction vehicles are traveling along the drivable surface 410), for instance.

As illustrated, the environment 402 may represent an initial time (e.g., $T_1$). At the initial time $T_1$, the static object 406 may obfuscate a portion of the environment 402 from sensors of the vehicle 404, causing an occluded region 412 indicated by light gray shading. The vehicle 404 may be able to sense a number of visible regions, such as visible region 414, that are not occluded. At the initial time $T_1$, the dynamic object 408 is located in the occluded area, and thus the sensors of the vehicle 404 have not yet detected the location or existence of the dynamic object 408. In other words, the vehicle 404 is unaware of the dynamic object 408 at the initial time $T_1$.

In some examples, an occlusion reasoning system of the vehicle 404 may use map data and/or data received from sensors of the vehicle 404 to generate an environment representation 416 of the environment 402 at the initial time $T_1$. The environment representation 416 includes representations of the vehicle 404, the static object 406, and the drivable region 410. The dynamic object 408 is also included in the environment representation 416 for illustrative purposes, but may not be included in an environment representation generated by the vehicle 404 due to being located in the occluded region 412 and thus not able to be sensed by sensors of the vehicle 404.

Similar to the occlusion grid 318 discussed in relation to FIG. 3, the vehicle 404 may generate an occlusion grid 418 that includes a plurality of occlusion fields representing discrete areas of the environment 402. The occlusion grid 418 can be generated from map data of the environment, and the occlusion reasoning system can use data from sensors of the vehicle 404 to determine the states of the occlusion fields.

For example, the occlusion reasoning system of the vehicle 404 may use map data of the environment to generate the occlusion fields of the occlusion grid 418 corresponding to the drivable region 410. The occlusion reasoning system of the vehicle 404 may also use one or more sensors to identify the static object 406, and determine that the static object 406 prevents the one or more sensors from viewing the occluded region 412. Based on this determination, the occlusion reasoning system may assign an indication of the occlusion fields included in the occluded region 412 as "indeterminate," as the occlusion reasoning system cannot say with certainty whether the occlusion fields in the occluded region 412 are occupied or not.

The occlusion reasoning system of the vehicle 404 may also use the map data to determine a direction of traffic associated with the drivable region 410. In the example 400, the direction of travel moves from right to left. Based on the direction of travel associated with the drivable region 410, the occlusion reasoning system of the vehicle can designate the visible region 414 as an entry region into the occluded region 412.

An environment 420 corresponds to the environment 402 at a second time $T_2$, after the initial time $T_1$. As shown, both the vehicle 404 and the static object 406 have remained stationary from the initial time $T_1$ to the second time $T_2$, and therefore the occluded region 412 remains the same. Because both the vehicle 404 and the static object 406 (e.g., the object causing the occluded region 412) have remained stationary from the initial time $T_1$ to the second time $T_2$, the occluded region in the example 400 may be considered static occluded region. The dynamic object 408 has progressed along a trajectory to traverse the drivable region 410 from behind the static object 406 at the initial time $T_1$ to appear in front of the static object 406 at the second time $T_2$, becoming visible to sensors of the vehicle 404.

Additionally, in some examples, the occlusion reasoning system of the vehicle 404 may use map data and/or data from sensors of the vehicle 404 to generate an environment representation 422 of the environment 420 at the second time $T_2$. The environment representation 422 includes representations of the vehicle 404, the static object 406, the dynamic object 408, and the drivable region 410.

The occlusion grid 418 is also represented in the environment representation 422. As time progresses from the initial time $T_1$ to the second time $T_2$, the occlusion reasoning system of the vehicle 404 can designate the occlusion fields previously designated as indeterminate as being "pseudo-visible" based knowledge of the static occluded region 412. For instance, the occlusion reasoning system of the vehicle 404 may use a minimum threshold speed to designate occlusion fields of the occlusion grid 418 as pseudo-visible, such as the 1.5 m/s speed described above. Using the visible region 414 and the identified entry region into the occluded region 412, the occlusion reasoning system can begin to change the designations of the occlusion fields from indeterminate to a pseudo-visible region 424, from right to left. As the occlusion reasoning system is generating the pseudo-visible region 424 from the initial time $T_1$ to the second time $T_2$, the dynamic object 408 appears out of the occluded region 412 into the area visible to the sensors of the vehicle 404. The occlusion reasoning system of the vehicle 404 may continue to change the designations of the occlusion fields from indeterminate to pseudo-visible within the occluded region 412 based on the minimum threshold speed, for as long as no dynamic objects enter the occluded region, or until all of the occlusion fields in the occluded region 412 are pseudo-visible.

The use of the minimum threshold speed to change the designation of the occlusion fields from indeterminate to pseudo-visible allows the occlusion reasoning system to continue to update these fields as time passes, despite the appearance of the previously-unseen dynamic object 408. Additionally, the use of the stationary doorman allows a planning system of the vehicle 404 to make a decision about when to release the vehicle 404 through the intersection without behaviors such as slowly creeping through the intersection to ensure all regions of the environment are visible before finally releasing the vehicle all of the way through the intersection. Instead, the vehicle 404 mimics natural behavior of human drivers by remaining stationary until the occluded region 412 becomes pseudo-visible, thus allowing passengers inside of the vehicle and humans outside of the vehicle to more accurately predict and react to the autonomous vehicle's actions.

Figure 5A:
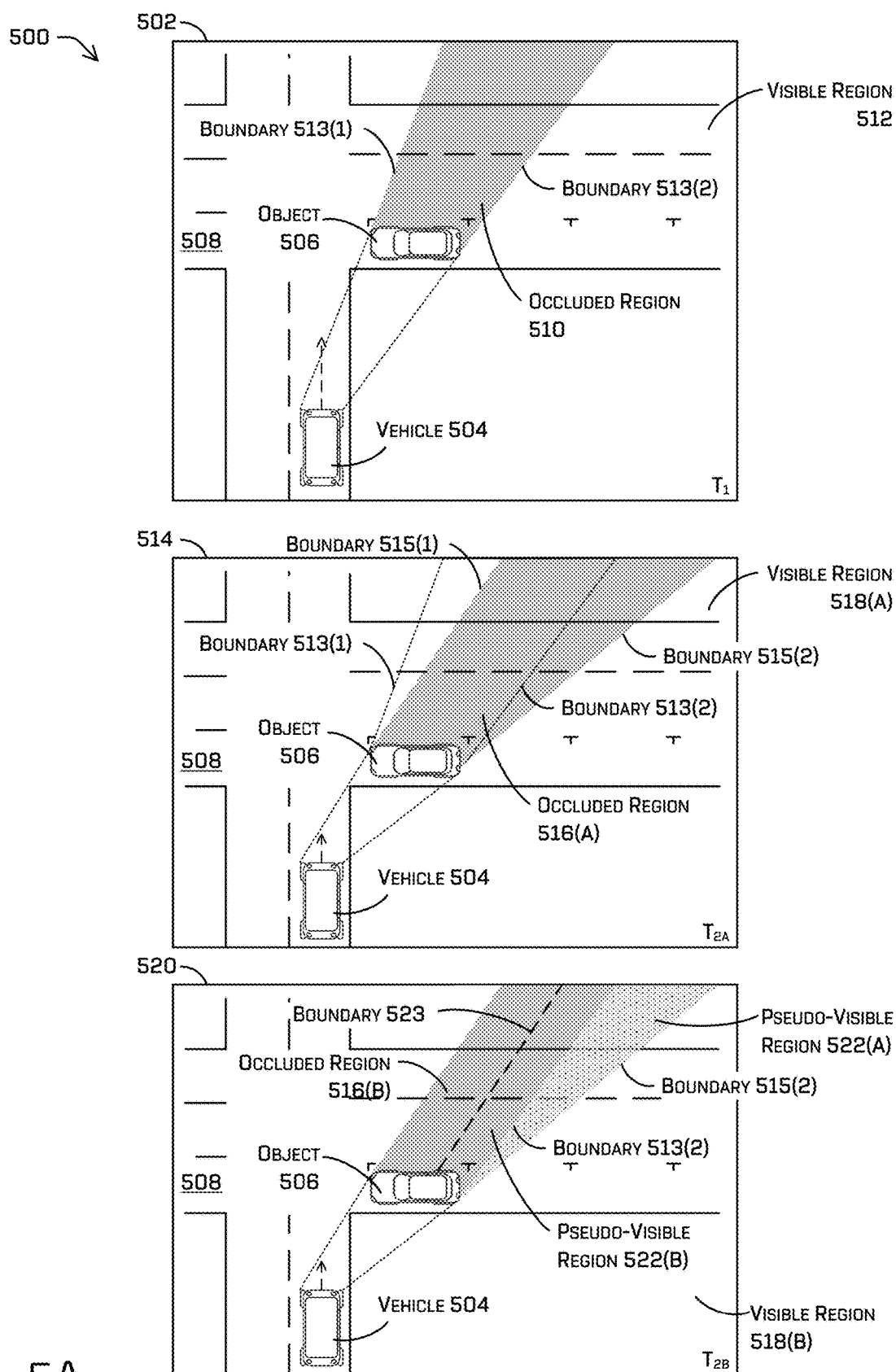
FIG. 5A is an example of identifying a moving occluded region and a pseudo-visible region of the moving occluded region, in accordance with embodiments of the disclosure.

FIG. 5A is an example of identifying a moving occluded region and a pseudo-visible region of the moving occluded region, in accordance with embodiments of the disclosure. FIG. 5B, is an example of an occlusion grid corresponding to the example shown in FIG. 5A.

An environment 502 includes a vehicle 504 (e.g., an autonomous vehicle), and an object 506 (e.g., another vehicle that is stationary or parked). The vehicle 504 is moving along a trajectory approaching an intersection of a drivable region 508. As illustrated, the environment 502 may represent an initial time (e.g., $T_1$). At the initial time $T_1$, the object 506 may obfuscate a portion of the environment 502 from sensors of the vehicle 504, causing an occluded region 510 indicated by light gray shading, and having a left boundary 513(1) and a right boundary 513(2). The vehicle 504 may be able to sense a number of visible regions, such as visible region 512, that are not occluded.

An environment 514 includes the vehicle 504 and the object 506 at a second time $T_{2A}$, after the initial time $T_1$. As the time progresses from the initial time $T_1$ to the second time $T_{2A}$, the vehicle 504 has traversed a portion of the drivable region 508 to arrive closer to the intersection. Consequently, as the vehicle 504 moves relative to the object 506, the occluded region 510 changes in shape and dimension to result in an occluded region 516(A), as indicated by the dashed lines corresponding to the location of the occluded region 510. The occluded region 510 is shown in the environment 514 with the left boundary 513(1) and the right boundary 513(2). The occluded region 516(A) is shown in the environment 514 having a left boundary 515(1) and a right boundary 515(2). Additionally, the visible region 512 changes in shape and dimension to result in a visible region 518(A) at the second time $T_{2A}$.

To provide further illustration of the change in occluded and visible areas from the initial time $T_1$ to the second time $T_2$, an environment 520 includes the vehicle 504 and the object 506 at a second time $T_{2B}$, after the initial time $T_1$ and corresponding to the second time $T_{2A}$. The environment 520 also includes a pseudo-visible region 522(A) that corresponds to the difference in the size and dimension of visible region 512 and the visible region 518(A), as the vehicle 504 moves from the initial time $T_1$ to the second time $T_{2A}/T_{2B}$. The pseudo-visible region 522(A) is formed by the right boundary 513(2) of the occluded region 510, and the right boundary 515(2) of the occluded region 516(a). In some examples, an occlusion reasoning system of the vehicle can utilize map data to determine a direction of traffic of the drivable region 508, as described herein, and designate the visible region 512 as an entry region into the occluded region 510 based on the known direction of traffic. In at least some examples, such a designation may be dependent on a direction of travel associated with the drivable region. As a non-limiting example, newly occluded areas which occlude portions of the environment in front of the occluded region 516(A) (e.g., with respect to a direction of travel, in this case on the left side of the occluded region 510) may be designated as occluded and not "pseudo-visible." Because at least one of the vehicle 504 and the object 506 that creates the occluded region 510 are moving in this example (in this case, the vehicle 504), the occlusion reasoning system of the vehicle may further designate at the occluded region(s) 512, 518(A), and/or 518(B) as a moving occluded region. The occlusion reasoning system of the vehicle 504 can supply a planning system of the vehicle 504 with information regarding the moving occluded region to use in controlling the vehicle 504, such as whether to stop at the intersection, how long to stop at the intersection, how fast to accelerate through the intersection, and so forth.

In some instances, a portion of the occluded region 516(A) that corresponds to the occluded region 510 can be considered as a static occluded region for the purposes of determining pseudo-visible regions. That is, the occlusion reasoning system can designate portions of the occluded region 516(B) as a pseudo-visible region 522(B) based on a threshold speed and/or time period between $T_1$ and $T_2$, in addition to the pseudo-visible region 522(A) illustrated in the environment 520. In this example, the pseudo visible region 522(B) is formed by the boundary 513(2) of the occluded region 510, and a boundary 523 that progresses from the entry region of the moving occluded regions in the direction of traffic as time passes. Accordingly, techniques for evaluating static occluded regions and moving occluded regions can be combined to quickly determine pseudo-visible regions based on captured data. In at least some such examples, determination of pseudo-visible occlusion fields may proceed from the leftmost (e.g., along the direction of traffic) occlusion field having a designation of visible or pseudo-visible.

Figure 5B:
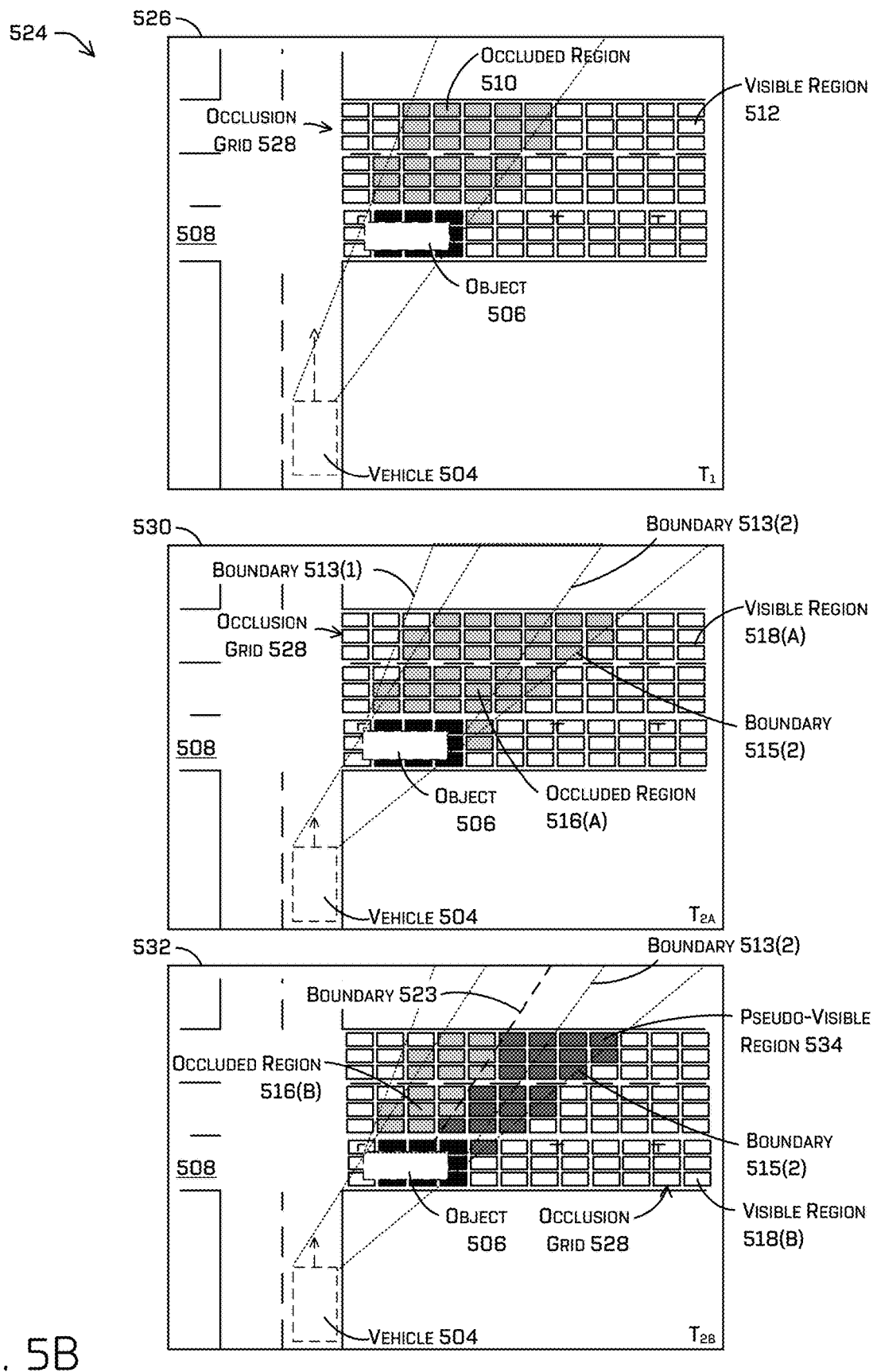
FIG. 5B is an example of determining occupancy states of the occluded region described in FIG. 5A, in accordance with embodiments of the disclosure.

FIG. 5B is an example 524 of determining occupancy states of the occluded region described in FIG. 5A, in accordance with embodiments of the disclosure.

In some examples, an occlusion reasoning system of the vehicle 504 of FIG. 5A may use map data and/or data from sensors of the vehicle 504 to generate an environment representation 526 of the environment 502 of FIG. 5A at the initial time $T_1$. The environment representation 526 includes representations of the vehicle 504, the object 506, and the drivable region 508. Similar to the occlusion grids discussed above, the vehicle 504 may generate an occlusion grid 528 that includes a plurality of occlusion fields representing discrete areas of the environment 502. The occlusion grid 528 can be generated from map data of the environment, and the occlusion reasoning system can use data from sensors of the vehicle 504 to determine the states of the occlusion fields.

For example, the occlusion reasoning system of the vehicle 504 may use map data of the environment to generate the occlusion fields of the occlusion grid 528 corresponding to the drivable region 508. The occlusion reasoning system of the vehicle 504 may also use one or more sensors to identify the object 506, and determine that the object 506 prevents the one or more sensors from viewing the occluded region 510. The occlusion fields occupied by the object 506 are colored black, to indicate the occupation of these fields by the object 506. Based on this determination, the occlusion reasoning system may assign an indication of the occlusion fields included in the occluded region 510 as "occluded" and/or "indeterminate" (e.g., with respect to an occlusion state and/or an occupied state) as the occlusion reasoning system cannot say with certainty whether the occlusion fields in the occluded region 510 are occupied or not.

In example 524, the vehicle 504 may be attempting to cross an intersection. As such, vehicle 504 may determine that an oncoming lane of traffic is relevant to determine visibility for safely crossing the intersection of drivable region 508. The occlusion reasoning system of the vehicle 504 may also use the map data to determine a direction of traffic associated with the drivable region 508. In the examples 500 and 524, the direction of travel moves from right to left. Based on the direction of travel associated with the drivable region 508, the occlusion reasoning system of the vehicle can designate the visible region 512 as an entry region into the occluded region 510. In at least some examples, such an entry region requires contiguous occlusion fields (e.g., having at least one adjacent side of the respective occlusion fields in common) from one side of the drivable region 508 to the other side along a boundary between occluded and visible regions, where the boundary corresponds to the incoming direction of travel. A similar technique can be performed to determine an exit region, with the exception that the boundary between occluded and visible regions corresponds to an outgoing direction of travel from the occluded region. If an entrance and exit region are identified on either side of the occluded region 510, reasoning about dynamic objects within the occluded region 510 can be performed. In such examples, dynamic objects that are traveling along the drivable region 508 are likely to continue along the drivable region 508 from the entry region into, and through, the occluded region 510, and exit via the exit region.

Additionally, in some examples, the occlusion reasoning system of the vehicle 504 may use map data and/or data from sensors of the vehicle 504 to generate an environment representation 530 of the environment 514 of FIG. 5A at the second time $T_{2A}$. The environment representation 530 includes representations of the vehicle 504, the object 506, and the drivable region 508.

The occlusion grid 528 is also represented in the environment representation 530. The occluded region 510 is also represented by the left boundary 513(1) and the right boundary 513(2). As time progresses from the initial time $T_1$ to the second time $T_{2A}$, the occlusion reasoning system of the vehicle 504 can designate the occlusion fields previously designated as indeterminate as being "pseudo-visible" based on knowledge of the moving occluded region. In some examples, designating the previously indeterminate occlusion fields as pseudo-visible may be dependent upon an entry region and/or an exit region being present from time $T_1$ to time $T_2$, even if the entry and exit regions move. If the vehicle 504 is no longer able to identify an entry region and, in at least some instances, an exit region from time $T_1$ to time $T_2$, the vehicle 504 may execute traversal of the environment using other techniques. In some instances, the occlusion fields corresponding to the moving occluded region may only transition from occluded to pseudo-visible against the direction of traffic, e.g., from the boundary 513(2) to the boundary 515(2).

For instance, as shown in environment representation 532 at time $T_{2B}$, occlusion fields of the occlusion grid 528 that were visible at the initial time $T_1$ but were occluded at the time $T_{2A}$ are included in a pseudo-visible region 534. To designate the pseudo-visible region 534, the occlusion reasoning system of the vehicle 504 leverages knowledge that there were no dynamic objects in the previously-designated entry region at the initial time $T_1$, and that no dynamic objects entered the entry region from the initial time $T_1$ to the second time $T_{2A}$. Therefore, once again assuming that the direction of traffic is from right to left, the occlusion reasoning system of the vehicle 504 can assume that the pseudo-visible region 534 is free of dynamic objects. The pseudo-visible region 534 may incorporate the pseudo-visibility of the moving occluded region represented by the boundary 513(2) on the left and the boundary 515(2) on the right. Additionally, the pseudo-visible region 534 may incorporate the pseudo-visibility of the static occluded region represented by the boundary 523 on the left and the boundary 513(2) on the right.

By designating the pseudo-visible region 534 as the vehicle approaches the intersection of the drivable region 508, the planning system of the vehicle 504 can make decisions about how to traverse the intersection faster and/or with greater confidence than conventional techniques that would require a vehicle to reach the intersection and then creep forward until all regions were visible before traversing the intersection.

Figure 6:
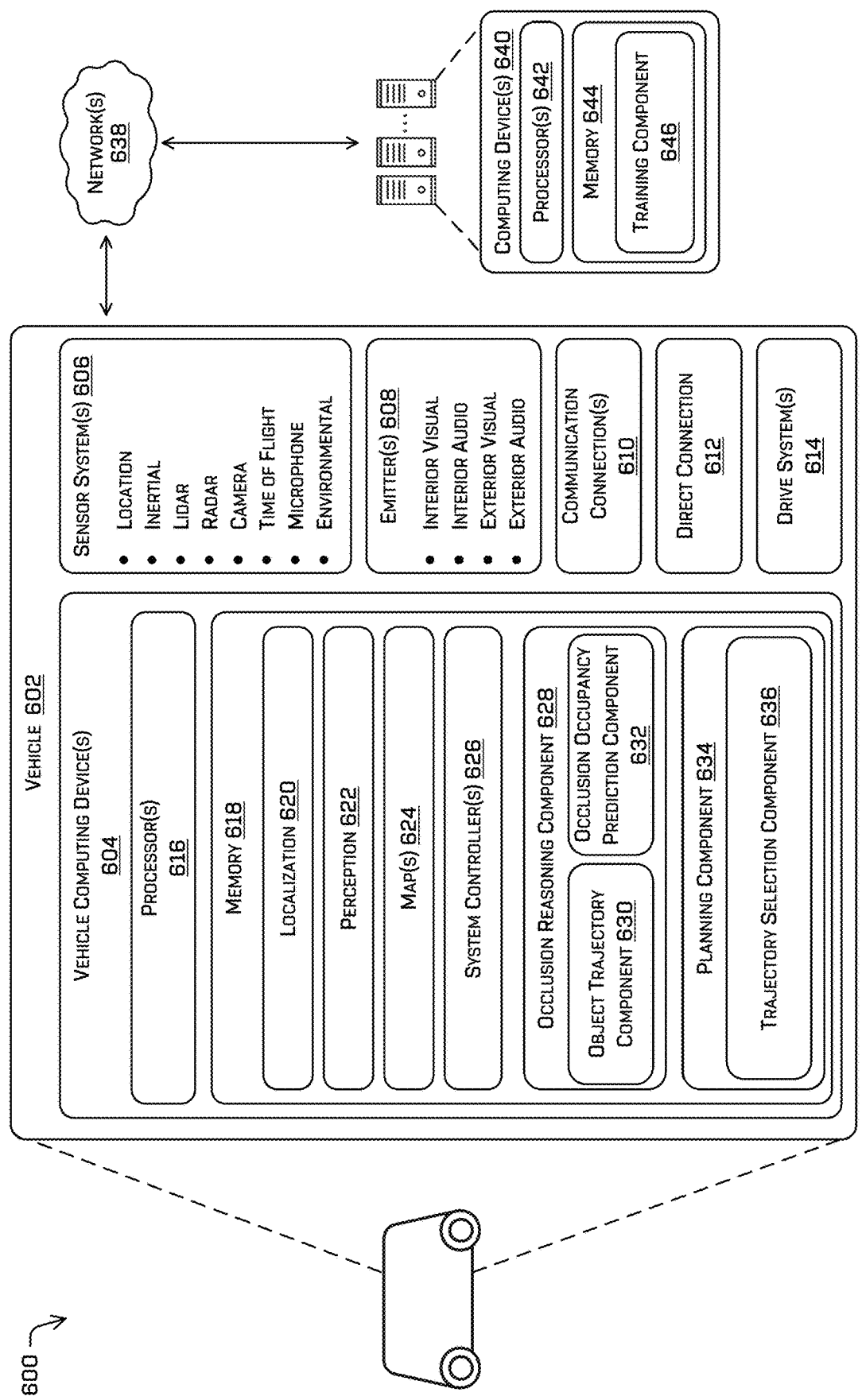
FIG. 6 depicts a block diagram of an example system for implementing the techniques described herein.

FIG. 6 depicts a block diagram of an example system 600 for implementing the techniques described herein. In at least one example, the system 600 can include a vehicle 602, which can correspond to the vehicle 112 of FIG. 1, the vehicle 202 of FIG. 2, the vehicle 304 of FIG. 3, the vehicle 404 of FIG. 4, and/or the vehicle 504 of FIGS. 5A and 5B.

The vehicle 602 can include vehicle computing device(s) 604, one or more sensor systems 606, one or more emitters 608, one or more communication connections 610, at least one direct connection 612, and one or more drive systems 614.

The vehicle computing device(s) 604 can include one or more processors 616 and memory 618 communicatively coupled with the one or more processors 616. In the illustrated example, the vehicle 602 is an autonomous vehicle; however, the vehicle 602 could be any other type of vehicle or robotic platform. In the illustrated example, the memory 618 of the vehicle computing device(s) 604 stores a localization component 620, a perception component 622, one or more maps 624, one or more system controllers 626, occlusion reasoning component 628, an object trajectory component 630, an occlusion occupancy prediction component 632, a planning component 634, and a trajectory selection component 636. Though depicted in FIG. 6 as residing in the memory 618 for illustrative purposes, it is contemplated that the localization component 620, the perception component 622, the one or more maps 624, the one or more system controllers 626, occlusion reasoning component 628, an object trajectory component 630, an occlusion occupancy prediction component 632, the planning component 634, and the trajectory selection component 636 can additionally, or alternatively, be accessible to the vehicle 602 (e.g., stored on, or otherwise accessible by, memory remote from the vehicle 602).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 620 can provide data to various components of the vehicle 602 to determine an initial position of an autonomous vehicle for generating a trajectory and/or for determining to retrieve map data including an occlusion grid from memory, as discussed herein.

In some instances, the perception component 622 can include functionality to perform object detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, stoplight, stop sign, unknown, etc.). In additional or alternative examples, the perception component 622 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 618 can further include one or more maps 624 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 624 can include at least one map (e.g., images and/or a mesh). In some examples, the vehicle 602 can be controlled based at least in part on the maps 624. That is, the maps 624 can be used in connection with the localization component 620, the perception component 622, the occlusion reasoning component 628, and/or the planning component 634 to determine a location of the vehicle 602, identify objects in an environment, and/or generate routes and/or trajectories to navigate within an environment.

In some examples, the one or more maps 624 can be stored on a remote computing device(s) (such as the computing device(s) 640) accessible via network(s) 638. In some examples, multiple maps 624 can be stored based on, for example, a characteristic (e.g., type of entity, time of day, day of week, season of the year, etc.). Storing multiple maps 624 can have similar memory requirements, but increase the speed at which data in a map can be accessed.

In some examples, the one or more maps 624 can store occlusion grids associated with individual locations in an environment. For example, as the vehicle 602 traverses the environment and as maps representing an area proximate to the vehicle 602 are loaded into memory, one or more occlusion grids associated with a location can be loaded into memory as well. In some examples, an occlusion grid can be generated dynamically based on map data.

In general, the occlusion reasoning component 628 can determine occluded areas of an environment caused by one or multiple objects in the environment based on data provided by the sensor system(s) 606. The occlusion reasoning component, in some examples, may correspond to the occlusion reasoning component 208 of FIG. 2. In some instances, the occlusion reasoning component 628 can provide occlusion information generated by the occlusion reasoning component 628 to the planning component 634 to determine when and/or how to control the vehicle 602 to traverse an environment. As discussed herein, the occlusion reasoning component 628 can receive lidar data, image data, map data, and the like to determine occlusion-related information in an environment. Examples of generating and/or using an occlusion grid are discussed in U.S. patent application Ser. No. 16/011,436, filed Jun. 18, 2018. Application Ser. No. 16/011,436 is herein incorporated by reference, in its entirety.

The object trajectory component 630 included in the occlusion reasoning component 628 determines trajectories of objects in the environment, such as in real time. A trajectory can be based on a current location of an object, along with evaluating the object over time to determine possible locations of the object based on an object classification, position, speed, acceleration, sensor uncertainty, and the like. The object trajectory component 630 may be configured to evaluate multiple object trajectories substantially simultaneously. For example, the object trajectory component 630 may evaluate one or more trajectories of objects causing corresponding occlusion(s) in an environment, and/or one or more trajectories of dynamic object(s) that may pass through occluded region(s) in the environment, and so forth. Examples of generating one or more trajectories are discussed in U.S. patent application Ser. No. 16/151,607, filed Oct. 4, 2018. Application Ser. No. 16/151,607 is herein incorporated by reference, in its entirety.

The occlusion occupancy prediction component 632 can determine a likelihood that an occluded area of an environment is free of dynamic objects, in accordance with any one or more of the examples provided herein. For example, the occlusion occupancy prediction component 632 can project an occluded region onto a map 624 of the environment surrounding the vehicle to determine what "known" parts of the environment will be occluded by the object. In some instances, the occlusion occupancy prediction component 632 can use ray casting and/or projection techniques to determine occluded regions associated with an object in addition to information about the particular sensor modality (e.g., range, field of view, etc.). Further, the occlusion occupancy prediction component 632 can determine entry and/or exit regions into the occluded regions based on the map 624, and determine whether an occluded region corresponds to a static occluded region (e.g., both the vehicle and occluding object are stationary), or a moving occluded region (e.g., one or both of the vehicle and the occluding object are moving). In some examples, the occlusion occupancy prediction component 632 can determine whether a dynamic object is located within an occluded region based on observation (e.g., by the sensor system(s) 606) of the environment, and provide this information to the planning component 634 to use in controlling the vehicle 602.

In general, the planning component 634 can determine a path for the vehicle 602 to follow to traverse the environment. For example, the planning component 634 can determine various routes and trajectories and various levels of detail. For example, the planning component 634 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 634 can generate an instruction for guiding the autonomous vehicle along at least a portion of the route from the first location to the second location. In at least one example, the planning component 634 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate.

In some instances, the planning component 634 can generate one or more trajectories for the vehicle 602 based at least in part on the knowledge of occluded areas of the surrounding environment, and/or whether a dynamic object is likely not within an occluded area, as discussed herein. In some examples, the planning component 634 can use temporal logic, such as linear temporal logic and/or signal temporal logic, to evaluate one or more trajectories of the vehicle 602.

In at least one example, the vehicle computing device(s) 604 can include one or more system controllers 626, which can be configured to control steering, propulsion, braking, safety, emitters, communication, and other systems of the vehicle 602. These system controller(s) 626 can communicate with and/or control corresponding systems of the drive system(s) 614 and/or other components of the vehicle 602.

As can be understood, the components discussed herein (e.g., the localization component 620, the perception component 622, the one or more maps 624, the one or more system controllers 626, occlusion reasoning component 628, an object trajectory component 630, an occlusion occupancy prediction component 632, the planning component 634, and the trajectory selection component 636) are described as divided for illustrative purposes. However, the operations performed by the various components can be combined or performed in any other component. By way of example, object location determination functions may be performed by the perception component 622 (e.g., rather than the object trajectory component 630) to reduce the amount of data transferred by the system.

In at least one example, the sensor system(s) 606 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, the lidar sensors can include individual lidar sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device(s) 604. Additionally or alternatively, the sensor system(s) 606 can send sensor data, via the one or more networks 638, to the one or more computing device(s) at a particular frequency, after a lapse of a predetermined period of time, in near real-time, etc.

The vehicle 602 can also include one or more emitters 608 for emitting light and/or sound, as described above. The emitters 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters.

By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device(s) 604 to another computing device or a network, such as network(s) 638. For example, the communications connection(s) 610 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive systems 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include one or more sensor systems to detect conditions of the drive system(s) 614 and/or the surroundings of the vehicle 602. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 614. Furthermore, the drive system(s) 614 also include one or more communication connection(s) that enable communication by the respective drive system with one or more other local or remote computing device(s).

In at least one example, the direct connection 612 can provide a physical interface to couple the one or more drive system(s) 614 with the body of the vehicle 602. For example, the direct connection 612 can allow the transfer of energy, fluids, air, data, etc. between the drive system(s) 614 and the vehicle. In some instances, the direct connection 612 can further releasably secure the drive system(s) 614 to the body of the vehicle 602.

In at least one example, the localization component 620, the perception component 622, the one or more maps 624, the one or more system controllers 626, the occlusion reasoning component 628, the object trajectory component 630, the occlusion occupancy prediction component 632, the planning component 634, and the trajectory selection component 636 can process sensor data, as described above, and can send their respective outputs, over the one or more network(s) 638, to one or more computing device(s) 640. In at least one example, the localization component 620, the perception component 622, the one or more maps 624, the one or more system controllers 626, the occlusion reasoning component 628, the object trajectory component 630, the occlusion occupancy prediction component 632, the planning component 634, and the trajectory selection component 636 can send their respective outputs to the one or more computing device(s) 640 at a particular frequency, after a lapse of a predetermined period of time, in near real-time, etc.

In some examples, the vehicle 602 can send sensor data to one or more computing device(s) 640 via the network(s) 638. In some examples, the vehicle 602 can send raw sensor data to the computing device(s) 640. In other examples, the vehicle 602 can send processed sensor data and/or representations of sensor data to the computing device(s) 640. In some examples, the vehicle 602 can send sensor data to the computing device(s) 640 at a particular frequency, after a lapse of a predetermined period of time, in near real-time, etc. In some cases, the vehicle 602 can send sensor data (raw or processed) to the computing device(s) 640 as one or more log files.

The computing device(s) 640 can include processor(s) 642 and a memory 644 storing a training component 646.

In some instances, the training component 646 can include functionality to train one or more models to determine object locations and/or trajectories, determine occluded regions, determine moving and/or stationary doormen, determine dynamic object behavior when in an occluded region (e.g., based on a specific location of an occluded region), and the like. In some instances, the training component 646 can communicate information generated by the one or more models to the vehicle computing device(s) 604 to revise how to control the vehicle 602 in response to different situations.

For instance, aspects of some or all of the components discussed herein can include any models, algorithms, and/or machine learning algorithms. For example, in some instances, the components in the memory 644 (and the memory 618, discussed above) can be implemented as a neural network. In some examples, the training component 646 can utilize a neural network to generate and/or execute one or more models to improve various aspects of occlusion reasoning for use in trajectory planning.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 616 of the vehicle 602 and the processor(s) 642 of the computing device(s) 640 can be any suitable processor capable of executing instructions to process data and perform operations as described herein. By way of example and not limitation, the processor(s) 616 and 642 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 644 are examples of non-transitory computer-readable media. The memory 618 and 644 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be associated with the computing device(s) 640 and/or components of the computing device(s) 640 can be associated with the vehicle 602. That is, the vehicle 602 can perform one or more of the functions associated with the computing device(s) 640, and vice versa. Further, aspects of the occlusion reasoning component 628 and/or the planning component 634 can be performed on any of the devices discussed herein.

Figure 7:
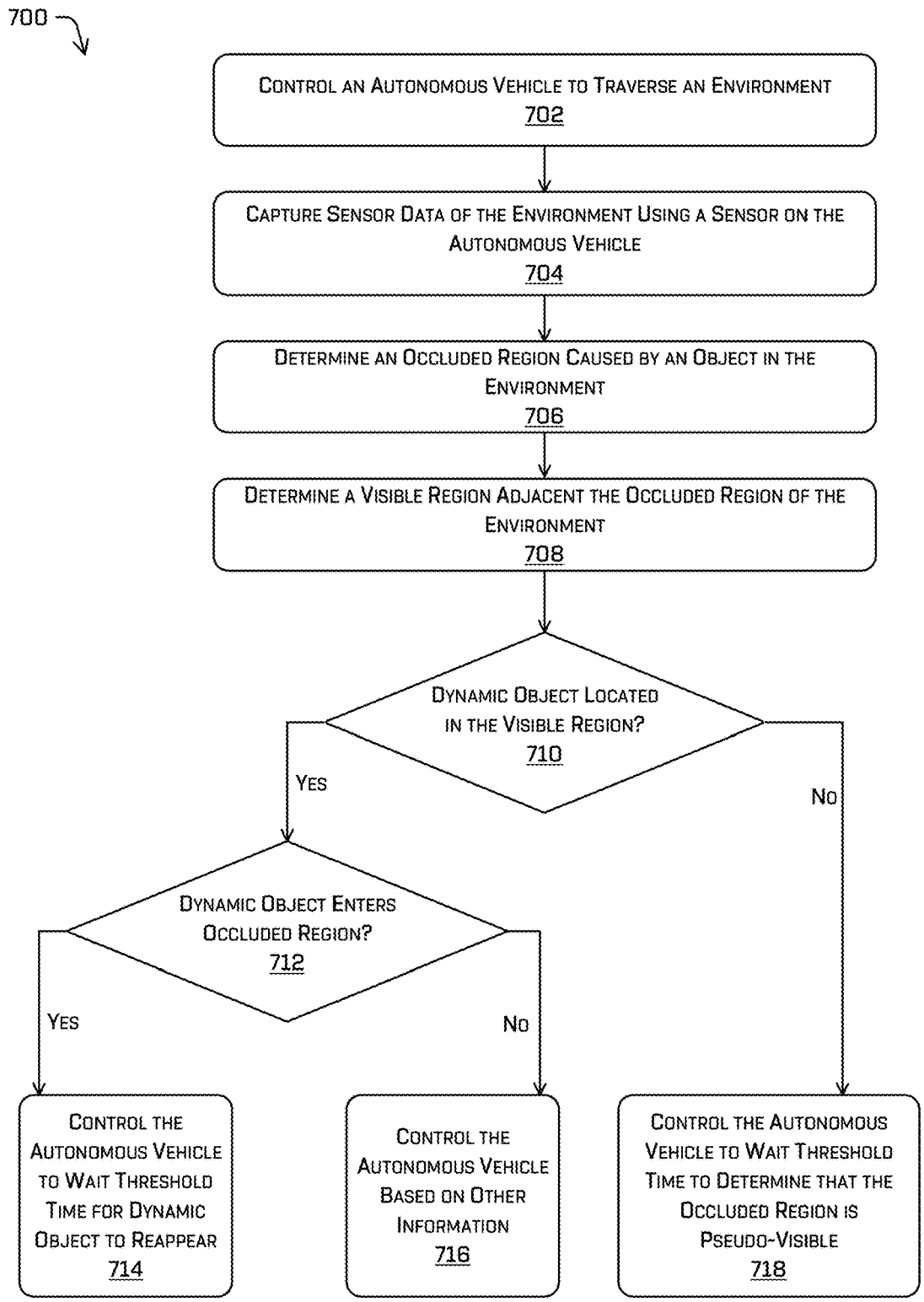
FIG. 7 depicts an example process for capturing sensor data, determining an occluded region caused by an object in an environment, determining a visible region proximate the occluded region, determining whether a dynamic object is located in the visible region, and if so, determining whether the dynamic object enters the occluded region, and controlling an autonomous vehicle based on the determinations, in accordance with embodiments of the disclosure.

FIG. 7 depicts an example process 700 for capturing sensor data, determining an occluded region caused by an object in an environment, determining a visible region proximate the occluded region, determining whether a dynamic object is located in the visible region, and if so, determining whether the dynamic object enters the occluded region, and controlling an autonomous vehicle based on the determinations, in accordance with embodiments of the disclosure. For example, some or all of the process 700 can be performed by one or more components in FIG. 6, as described herein. For example, some or all of the process 700 can be performed by the vehicle computing device(s) 604. Further, any of the operations described in the example process 700 may be executed in parallel, in a different order than depicted in the process 700, omit any of the operations of the depicted process 700, and/or be combined with any of the operations of the process 800.

At operation 702, the process can include controlling an autonomous vehicle to traverse an environment. For example, the operation 702 may include controlling the autonomous vehicle to follow one or more trajectories between waypoints to reach a destination.

At operation 704, the process can include capturing sensor data of the environment using a sensor on the autonomous vehicle. In some examples, the operation 704 can include capturing lidar data, image data, radar data, time of flight data, and the like, of the environment.

At operation 706, the process can include determining an occluded region caused by an object in the environment. For example, an occlusion grid may be applied to map data of the environment surrounding the vehicle. The sensor data may then be used to detect an object in the environment, and may be applied to determine an occupancy state of occlusion fields of the occlusion grid at the location of the object. Occlusion fields that are obfuscated by the object from the sensors may be categorized as indeterminate, as the vehicle may not be able to tell whether such fields are occupied or unoccupied by other objects in the environment.

At operation 708, the process can include determining a visible region adjacent the occluded region of the environment. For instance, the occlusion grid may be used to determine one or more areas of the environment that are visible by determining which occlusion fields are both unoccluded and unoccupied. The map data may also be used to determine a direction of traffic (e.g., vehicle traffic, pedestrian traffic, bicycle traffic, etc.) that passes through the visible region, and may assign a portion of the visible region as an entry region to the occluded region based on the direction of traffic. As discussed herein, in some cases an extent of the visible region must correspond to an extent of the occluded region. That is to say, an entry region can be defined as a visible region that spans all entries into the occluded region (e.g., determining one or more occlusion fields share at least a side in common from a first side of the drivable region to an opposing side of the drivable region perpendicular to the direction of traffic). In some cases, a visible region that does not span the width of the occluded region may not be considered an entry region and the operations discussed herein may not be used to determine pseudo-visible regions. In at least some examples, a similar technique may be applied to determine an exit region (e.g., a boundary of a side of the occluded region furthest and/or opposite the entry region along the direction of traffic). In at least some examples, if an exit region is not identified, the operations discussed herein may not be used to determine pseudo-visible regions.

At operation 710, the process may include determining whether a dynamic object is located in the visible region. In some examples, a dynamic object may be detected by the sensors of the vehicle, as described above. If a dynamic object is determined to be located in the visible region (and the occluded region is within a threshold distance of the vehicle), at 712 the process may include determining whether the dynamic object enters the occluded region. For instance, the vehicle may maintain a current trajectory (e.g., maintain a current speed, maintain a current rate of acceleration/deceleration, maintain a stopped position, etc.) from an initial time that the dynamic object is detected until a second time after the initial time when the dynamic object enters the occluded region. In at least some examples, additional information about the vehicle may be stored, such as, but not limited to, features, embeddings, and the like.

At operation 714, if it is determined that the dynamic object does enter the occluded region, the process may include controlling the autonomous vehicle to wait a threshold time for the dynamic object to reappear. In some examples, the threshold time may be based on a minimum threshold speed associated with the occluded region and/or a number of occlusion fields. The minimum threshold speed may be based on a speed that the dynamic object was observed to be traveling in the visible region, for instance. Controlling the vehicle to wait the threshold time may include maintaining a current trajectory of the vehicle, as described just above. If the dynamic object does reappear, at least some of the regions of the occlusion grid that were previously designated indeterminate may be considered pseudo-visible, based on an estimation of where in the occluded region the dynamic object passed through. Upon determining that the dynamic object has reappeared from the occluded region, the vehicle may be controlled to continue traversing the environment accordingly. Additionally, if the dynamic object does not reappear from the occluded region, the vehicle's trajectory may be maintained and/or changed based on the circumstances, such as to creep along a drivable region to obtain additional visible area of the environment. In at least some examples, observation of a dynamic object entering the occluded region may cause a state associated with all occlusion fields within the occlusion region to be designated "indeterminate." In such examples, flow may proceed to 718.

At operation 716, if it is determined that the dynamic object does not enter the occluded region, the process may include controlling the autonomous vehicle based on other information. For example, the autonomous vehicle may be controlled according to instructions from a planning system to avoid objects (e.g., the dynamic object) along a route to reach the vehicle's destination, creeping to obtain additional visibility of the environment by the sensors of the vehicle, and the like. In some cases, the vehicle may be controlled as discussed in reference to operation 718, if it is determined that the dynamic object dos not enter the occluded region.

At operation 718, if it is determined that there is no dynamic object located in the visible region, the process may include controlling the autonomous vehicle to wait a threshold time to determine that the occluded region is pseudo-visible. Similar to the discussion above, controlling the autonomous vehicle to wait may include maintaining a current trajectory (e.g., maintaining a current speed, maintaining a current rate of acceleration/deceleration, maintaining a stopped position, etc.) for the threshold amount of time. In this case, the threshold amount of time may be based on an average pedestrian speed of 1.5 m/s, although any suitable threshold speed may be used. As the threshold time passes, the vehicle may change the designation of the indeterminate occlusion fields of the occlusion grids to pseudo-visible, beginning from the entry region into and through the occluded region of the occlusion grid. If all (or a sufficient number) of the occlusion fields of the occlusion grid are determined to be pseudo-visible without a dynamic object appearing from the occluded region, the vehicle may be controlled to continue along a route to a destination. If a dynamic object does appear from the occluded region, the vehicle may be controlled accordingly, such as to avoid the dynamic object.

Figure 8:
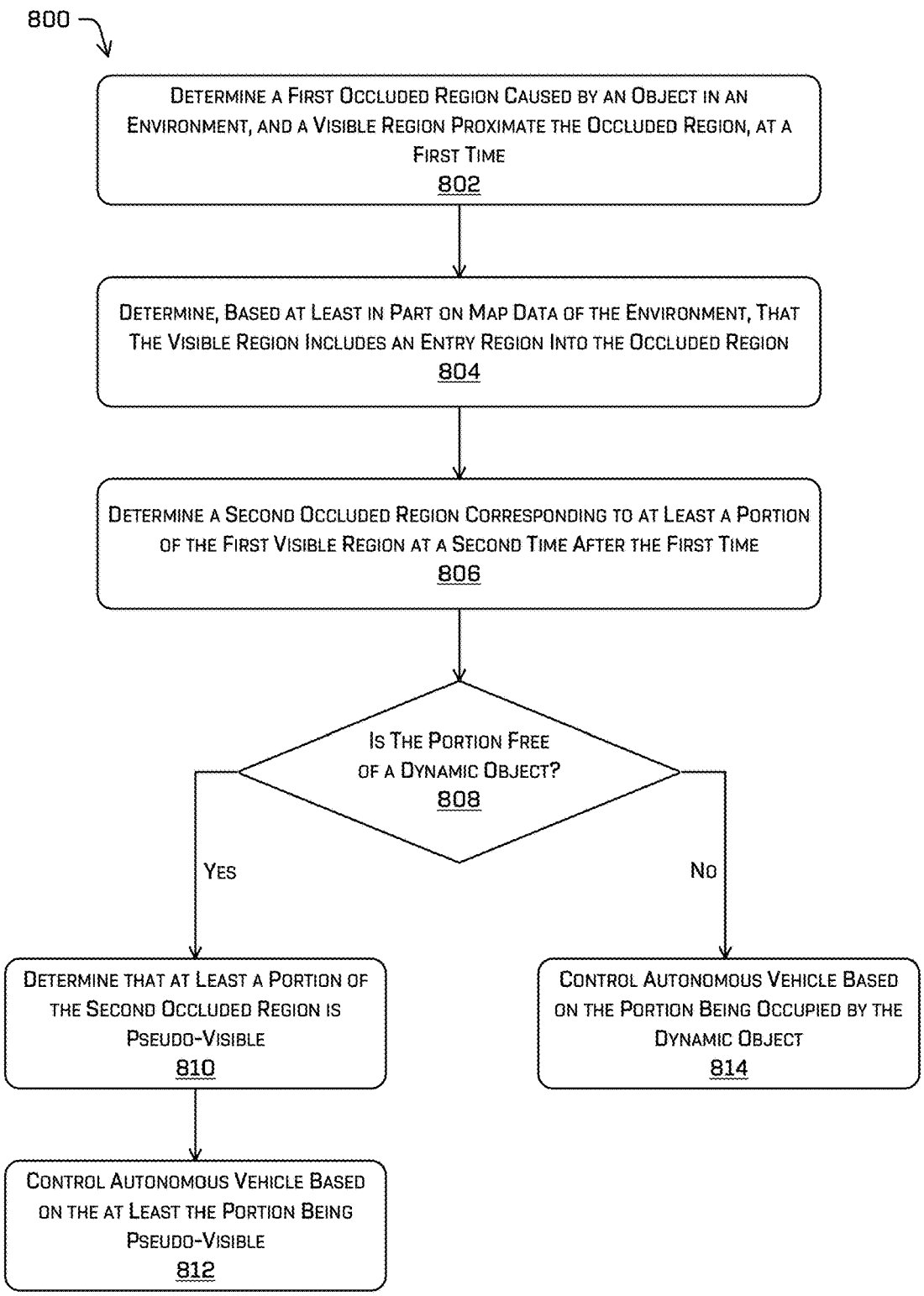
FIG. 8 depicts an example process for determining a first occluded region caused by an object and a visible region proximate the occluded region at a first time, determining that the visible region includes an entry region into the occluded region, determining a second occluded region corresponding to at least a portion of the first visible region at a second time after the first time, determining whether the portion is free of a dynamic object and controlling an autonomous vehicle based on the determination, in accordance with embodiments of the disclosure.

FIG. 8 depicts an example process 800 for determining a first occluded region caused by an object and a visible region proximate the occluded region at a first time, determining that the visible region includes an entry region into (and/or exit region from) the occluded region, determining a second occluded region corresponding to at least a portion of the first visible region at a second time after the first time, determining whether the portion is free of a dynamic object and controlling an autonomous vehicle based on the determination, in accordance with embodiments of the disclosure. For example, some or all of the process 800 can be performed by one or more components in FIG. 8, as described herein. For example, some or all of the process 800 can be performed by the vehicle computing device(s) 604. Further, any of the operations described in the example process 800 may be executed in parallel, in a different order than depicted in the process 800, omit any of the operations of the depicted process 800, and/or be combined with any of the operations of the process 700.

At operation 802, the process can include determining a first occluded region caused by an object in an environment, and a visible region proximate the occluded region, at a first time. In at least some examples, such an occlusion region may be based at least in part on an action to be performed (e.g., crossing an intersection), an assumed travel speed and a safety margin, a geolocation, and the like. For example, an occlusion grid may be applied to map data of the environment surrounding a vehicle. The sensor data may then be used to detect an object in the environment, and applied to determine an occupancy state of occlusion fields of the occlusion grid at the location of the object. Occlusion fields which are obfuscated by the object from the sensors may be categorized as occluded and/or indeterminate, while occlusion fields that are unoccupied and not obfuscated may be considered visible.

At operation 804, the process can include determining, based at least in part on map data of the environment, that the visible region includes an entry region into (and/or an exit region from) the occluded region. In some examples, the entry region may be based on determining a direction of traffic relative to the occluded region (e.g., vehicle traffic, pedestrian traffic, bicycle traffic, etc.).

At operation 806, the process can include determining a second occluded region corresponding to at least a portion of the first visible region at a second time after the first time. In some examples, the operation 806 is based on the concept of a moving occluded region, in which one or both of the vehicle and the object(s) causing the occluded region are moving. As time passes (e.g., from the first time to the second time) and the vehicle and/or object(s) move through the environment, the area and/or dimension of the occluded region may also change. In at least some examples, additional information about the previously visible region may be determined, or otherwise stored, such as which side of the previously occluded region the previously visible region was on with respect to a direction of traffic. The operation 806 may also include determining whether an entry region and/or an exit region exists for the second occluded region. If no entry and/or exit region is present for the second occluded region, the second occluded region may not be used.

At operation 808, the process can include determining whether the portion of the first visible region that is occluded at the second time is free of a dynamic object. For example, the entry region may be observed from the first time to the second time, and based on the knowledge of the direction of traffic, a determination can be made as to whether a dynamic object has entered the portion. In some cases, the portion may have included the dynamic object at the first time.

If it is determined that the portion is free of a dynamic object, at operation 810, the process can include determining that at least a portion of the second occluded region is pseudo-visible. For instance, based on knowledge that a dynamic object would most likely enter the occluded region through the entry region and in the direction of traffic, the operation 810 can assume that without a dynamic object present in the entry region from the first time to the second time that the portion is free of a dynamic object.

At operation 812, the process can include controlling the autonomous vehicle based on the at least the portion being pseudo-visible. The operation 812 may also include determining states of occlusion fields other than those analyzed for pseudo-visibility to control the vehicle. In some examples, determining that at least the portion of the occluded region is unoccupied may allow the autonomous vehicle to perform actions, such as continuing along a trajectory, faster than requiring all regions to be visible and clear to sensors of the vehicle before performing such actions.

If it is determined that the portion is not free of a dynamic object, at operation 814 the process can include controlling the autonomous vehicle based on the portion being occupied by the dynamic object. The operation 814 may also include determining states of occlusion fields other than those analyzed for pseudo-visibility to control the vehicle. For instance, the vehicle may maintain a current trajectory (e.g., maintain a current speed, maintain a current rate of acceleration/deceleration, maintain a stopped position, etc.) until the dynamic object reappears, or may take other measures to ensure that the environment is traversed safely with the knowledge that the dynamic object is not visible by sensors of the vehicle.

EXAMPLE CLAUSES

A: A system comprising: one or more processors; and one or more computer-readable media storing instructions executable by the one or more processors, wherein the instructions, when executed, cause the system to perform operations comprising: receiving sensor data of an environment captured by a sensor on a vehicle; detecting, based at least in part on the sensor data, an object in the environment; determining, based at least in part on the object and the sensor data, an occluded region in the environment associated with the object; determining, based at least in part on the sensor data, a visible region of the environment adjacent to the occluded region; determining, based at least in part on map data representing the environment, that the visible region represents an entry region into the occluded region; determining, based at least in part on the sensor data and a threshold speed associated with the occluded region, that a probability that at least a portion of the occluded region is free of a dynamic object meets or exceeds a threshold value; and controlling the vehicle based at least in part on determining that the at least the portion of the occluded region is free of the dynamic object.

B: The system of paragraph A, wherein a size of the portion of the occluded region determined to be free of the dynamic object is based at least in part on a period of time associated with capturing the sensor data.

C: The system of paragraph A or B, wherein the occluded region is a first occluded region at a first time, wherein the operations further comprise: determining a second occluded region associated with a second time after the first time, wherein the second occluded region corresponds to at least a portion of the visible region; and determining that a probability that at least a portion of the second occluded region is free of the dynamic object meets or exceeds the threshold value is based at least in part on the determining that the at least the portion of the first occluded region is free of the dynamic object; wherein controlling the vehicle is further based on the determination that the probability that the second occluded region is free of the dynamic object meets or exceeds the threshold value.

D: The system of paragraph C, wherein at least one of: the second occluded region is based at least in part on first movement of the vehicle between the first time and the second time; or the second occluded region is based at least in part on second movement of the object between the first time and the second time.

E: The system of any of paragraphs A-D, wherein: a first extent of the occluded region corresponds to a second extent of the entry region such that individual portions of the occluded region are associated with corresponding individual portions of the entry region; and the second extent of the entry region corresponds to a drivable region associated with the occluded region.

F: The system of paragraph E, the operations further comprising determining the drivable region and a direction of travel associated with the drivable region based at least in part on the map data representing the environment.

G: A method comprising: capturing first sensor data using a sensor; determining, based at least in part on the first sensor data, a drivable region of an environment; determining an occluded region in the environment associated with the drivable region; determining a visible region of the environment, the visible region proximate the occluded region; determining that the visible region corresponds to an entry region into the occluded region; determining, based at least in part on capturing second sensor data over a period of time, that a probability that at least a portion of the occluded region is free of a dynamic object meets or exceeds a threshold value; and controlling a vehicle based at least in part on the probability that the at least the portion of the occluded region is free of the dynamic object meets or exceeds the threshold value.

H: The method of paragraph G, wherein the visible region is a first visible region, the method further comprising: determining that an object is visible in the entry region at a first time; determining that at least a portion of the object is in the occluded region at a second time after the first time; determining that the object is in a second visible region at a third time after the second time, wherein the second visible region is an exit region from the occluded region; and based on determining that the object is in the exit region, determining that the probability that the at least the portion of the occluded region is free of the dynamic object meets or exceeds the threshold value.

I: The method of paragraph H, further comprising determining that a probability that an additional portion of the occluded region is free of the dynamic object meets or exceeds the threshold value is based at least in part on a threshold speed or threshold amount of time associated with the occluded region.

J: The method of any of paragraphs G-I, further comprising determining a direction of traffic, wherein the entry region corresponds to the direction of traffic entering the occluded region and a width of a traffic lane of the drivable region.

K: The method of paragraph J, wherein determining the occluded region comprises identifying an object in the environment that occludes at least a portion of map data associated with the environment, the method further comprising: discretizing the occluded region into one or more fields corresponding to the drivable region using the map data; and determining that the probability that the at least the portion of the occluded region is free of the dynamic object meets or exceeds the threshold value for the one or more fields.

L: The method of any of paragraphs G-K, wherein one or more of the vehicle or an occluding object are moving, and wherein the at least the portion of the occluded region corresponds to an area comprised in the visible region at a first time and comprised in the occluded region at a second time.

M: The method of any of paragraphs G-L, wherein determining that the probability that the at least the portion of the occluded region is free of the dynamic objects meets or exceeds the threshold value is based at least in part on a threshold speed or a threshold amount of time associated with the occluded region.

N: A non-transitory computer-readable medium storing instructions that, when executed, cause one or more processors to perform operations comprising: capturing first sensor data using a sensor; determining, based at least in part on the first sensor data, a drivable region of an environment; determining an occluded region in the environment associated with the drivable region; determining a visible region of the environment, the visible region proximate the occluded region; determining that the visible region corresponds to an entry region into the occluded region; determining, based at least in part on capturing second sensor data over a period of time, a probability that at least a portion of the occluded region is free of a dynamic object; and controlling a vehicle based at least in part on the probability.

O: The non-transitory computer-readable medium of paragraph N, wherein the visible region is a first visible region, the operations further comprising: determining that an object is visible in the entry region at a first time; determining that at least a portion of the object is in the occluded region at a second time after the first time; determining that the object is in a second visible region at a third time after the second time, wherein the second visible region is an exit region from the occluded region; and based on determining that the object is in the exit region, determining the probability that at least the portion of the occluded region is free of the dynamic object corresponding to a path of the object through the occluded region.

P: The non-transitory computer-readable medium of paragraph N or O, wherein the occluded region and the visible region are discretized into one or more occlusion fields, and wherein the entry region comprises contiguous occlusion fields having at least one adjacent side of respective occlusion fields in common from one side to an opposite side along a boundary between the occluded region and the visible region, the boundary corresponding to an incoming direction of travel.

Q: The non-transitory computer-readable medium of any of paragraphs N-P, wherein one or more of the vehicle or an occluding object are moving, and wherein the at least the portion of the occluded region corresponds to an area in the visible region at a first time and in the occluded region at a second time.

R: The non-transitory computer-readable medium of paragraph N, wherein determining the probability that the at least the portion of the occluded region is free of the dynamic object is based at least in part on a threshold speed or a threshold amount of time associated with the occluded region and corresponds to a direction of travel through the occluded region.

S: The non-transitory computer-readable medium of any of paragraphs N-R, wherein the sensor data comprises one or more of lidar sensor data, radar sensor data, image sensor data, or time of flight sensor data.

T: The non-transitory computer-readable medium of any of paragraphs N-S, the operations further comprising: localizing, based on the sensor data, to a map; determining, based on the map, a region to consider as the occluded region; and discretizing the region into a plurality of occlusion fields.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
determining, as an occluded region, a portion of an environment that is occluded from a sensor;
determining, based at least in part on receiving sensor data from the sensor, a probability that at least a portion of the occluded region is free of an object, wherein determining the probability is performed subsequent to determining the portion; and
controlling a vehicle based at least in part on the probability that the at least the portion of the occluded region is free of the object.

2. The system of claim 1, wherein the instructions, when executed, further cause the system to perform operations comprising:
determining a drivable region of the environment, the occluded region associated with the drivable region; and
determining, as a visible region, another portion of the environment proximate to the occluded region.

3. The system of claim 2, wherein the visible region is a first visible region, and wherein the instructions, when executed, further cause the system to perform operations comprising:
determining that an object is visible in the first visible region at a first time;
determining that at least a portion of the object is in the occluded region at a second time after the first time; and
determining that the object is in a second visible region at a third time after the second time, and
wherein determining the probability is further based at least in part on determining that the object is in the second visible region.

4. The system of claim 1, wherein determining the probability is further based at least in part on a speed limit associated with the occluded region.

5. The system of claim 2, wherein the instructions, when executed, further cause the system to perform operations comprising determining a direction of traffic, and
wherein determining the probability is further based at least in part on the direction of traffic entering the occluded region and a width of a traffic lane of the drivable region.

6. The system of claim 1, wherein the instructions, when executed, further cause the system to perform operations comprising:
discretizing the occluded region into a plurality of fields, and
wherein determining the probability is based at least in part on determining whether a value associated with a field of the plurality of fields meets or exceeds a threshold value.

7. The system of claim 1, wherein the occluded region changes over time.

8. A method comprising:
determining, as an occluded region, a portion of an environment that is occluded from a sensor;
determining, based at least in part on receiving sensor data from the sensor, a probability that at least a portion of the occluded region is free of an object, wherein determining the probability is performed subsequent to determining the portion; and
controlling a vehicle based at least in part on the probability that the at least the portion of the occluded region is free of the object.

9. The method of claim 8, further comprising:
determining a drivable region of the environment, the occluded region associated with the drivable region; and
determining, as a visible region, another portion of the environment proximate to the occluded region.

10. The method of claim 9, wherein the visible region is a first visible region, the method further comprising:
determining that an object is visible in the first visible region at a first time;
determining that at least a portion of the object is in the occluded region at a second time after the first time; and
determining that the object is in a second visible region at a third time after the second time, and
wherein determining the probability is further based at least in part on determining that the object is in the second visible region.

11. The method of claim 9, wherein determining the probability is further based at least in part on a speed limit associated with the occluded region.

12. The method of claim 9, further comprising:
determining a direction of traffic, and
wherein determining the probability is further based at least in part on the direction of traffic entering the occluded region and a width of a traffic lane of the drivable region.

13. The method of claim 12, the method further comprising:
discretizing the occluded region into a plurality of fields, and
wherein determining the probability is based at least in part on determining whether a value associated with a field of the plurality of fields meets or exceeds a threshold value.

14. The method of claim 9, wherein the occluded region changes over time.

15. One or more non-transitory computer-readable media storing instructions that, when executed, cause one or more processors to perform operations comprising:
determining, as an occluded region, a portion of an environment that is occluded from a sensor;
determining, based at least in part on receiving sensor data from the sensor, a probability that at least a portion of the occluded region is free of an object, wherein determining the probability is performed subsequent to determining the portion; and controlling a vehicle based at least in part on the probability that the at least the portion of the occluded region is free of the object.

16. The one or more non-transitory computer-readable media of claim 15, the operations further comprising:

determining a drivable region of the environment, the occluded region associated with the drivable region; and determining, as a visible region, another portion of the environment proximate to the occluded region.

17. The one or more non-transitory computer-readable media of claim 16, wherein the visible region is a first visible region, the operations further comprising:

determining that an object is visible in the first visible region at a first time;

determining that at least a portion of the object is in the occluded region at a second time after the first time; and determining that the object is in a second visible region at a third time after the second time, and wherein determining the probability is further based at least in part on determining that the object is in the second visible region.

18. The one or more non-transitory computer-readable media of claim 15, the operations further comprising:

discretizing the occluded region into a plurality of fields, and wherein determining the probability is based at least in part on determining whether a value associated with a field of the plurality of fields meets or exceeds a threshold value.

19. The one or more non-transitory computer-readable media of claim 15, wherein the occluded region changes over time.

20. The one or more non-transitory computer-readable media of claim 15, wherein determining the probability is further based at least in part on a speed limit associated with the occluded region.

* * * * *